(12) United States Patent
Ogawa et al.

(10) Patent No.: US 8,283,086 B2
(45) Date of Patent: Oct. 9, 2012

(54) FUEL CELL AND FUEL CELL STACK

(75) Inventors: Tetsuya Ogawa, Wako (JP); Koji Dan, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 1243 days.

(21) Appl. No.: 11/975,026

(22) Filed: Oct. 17, 2007

(65) Prior Publication Data

US 2008/0096086 A1 Apr. 24, 2008

(30) Foreign Application Priority Data

Oct. 19, 2006 (JP) ................................. 2006-285234

(51) Int. Cl.
*H01M 8/24* (2006.01)
*H01M 8/10* (2006.01)
*H01M 2/14* (2006.01)
*H01M 2/38* (2006.01)
*H01M 2/40* (2006.01)

(52) U.S. Cl. .......................... 429/457; 429/483; 429/508

(58) Field of Classification Search .................. 429/428, 429/430, 443–444, 446, 448–449, 452, 545, 429/456–458, 463, 466–467, 469–470, 512–516, 429/535, 483, 508

See application file for complete search history.

(56) References Cited

U.S. PATENT DOCUMENTS

| 5,441,819 | A  | * | 8/1995 | Voss et al. .................... 429/414 |
| 6,677,069 | B1 |   | 1/2004 | Piascik et al. |
| 2005/0142423 | A1 |   | 6/2005 | Homma et al. |
| 2005/0142424 | A1 | * | 6/2005 | Homma et al. ................. 429/38 |

FOREIGN PATENT DOCUMENTS

| JP | 10-172594 | 6/1998 |
| JP | 11-354141 | 12/1999 |
| JP | 2005-166529 | 6/2005 |

OTHER PUBLICATIONS

International Search Report for Application No. PCT/JP2007/070301, dated Jan. 31, 2008.
Japanese Office Action for Application No. 2006-285234, 5 pages, dated Apr. 24, 2012.

* cited by examiner

*Primary Examiner* — Barbara Gilliam
*Assistant Examiner* — Claire L Roe
(74) *Attorney, Agent, or Firm* — Nelson Mullins Riley & Scarborough LLP; Anthony A. Laurentano

(57) ABSTRACT

A separator includes a plurality of first and second sandwiching sections, a plurality of first bridges connected thereto, and first and second fuel gas supply units integrally connected to the first bridges. Electrolyte electrode assemblies are sandwiched between the first and second sandwiching sections. A fuel gas supply channel is formed in each of the first bridges. A fuel gas supply passage extends through the first and second fuel gas supply units in a stacking direction. A pressure loss generator mechanism is provided in the fuel gas supply channel. The pressure loss generator mechanism generates a pressure loss over the entire fuel gas supply channel for distributing a fuel gas equally to each of the electrolyte electrode assemblies.

14 Claims, 18 Drawing Sheets

--→ FUEL GAS
——→ OXYGEN-CONTAINING GAS

FUEL CELL AND FUEL CELL STACK

BACKGROUND OF THE INVENTION

1. Field of the Invention

The present invention relates to a fuel cell formed by stacking electrolyte electrode assemblies between separators. Each of the electrolyte electrode assemblies includes an anode, a cathode, and an electrolyte interposed between the anode and the cathode. Further, the present invention relates to a fuel cell stack formed by stacking a plurality of the fuel cells.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

In the fuel cell, in order to supply a fuel gas such as a hydrogen-containing gas and an oxygen-containing gas such as the air to the anode and the cathode of the electrolyte electrode assembly, a fuel gas channel and an oxygen-containing gas channel are formed along surfaces of the separator. The fuel cell stack may adopt internal manifold structure where a fuel gas supply unit and an oxygen-containing gas supply unit extend in the stacking direction for distributing the fuel gas and the oxygen-containing gas to each fuel gas channel and each oxygen-containing gas channel.

For example, in a flat plate type solid oxide fuel cell disclosed in Japanese Laid-Open Patent Publication No. 10-172594, unit cells (not shown) and separators 1 are provided alternately, and as shown in FIG. 18, gas supply holes 2a, 3a, and gas discharge holes 2b, 3b extend through four corners of the separator 1 in the stacking direction, and a plurality of gas flow grooves 4a and ridges 4b in a plurality of rows are arranged alternately along the surface of the separator 1.

The gas flow grooves 4a are connected to the gas supply hole 2a and the gas discharge hole 2b through triangular recesses 5a, 5b. A throttle section 6 and blocks 7 are provided in a gas inlet of the triangular recess 5a, near the gas supply hole 2a, as means for limiting the flow rate of the gas. The throttle section 6 and the blocks 7 function to increase the pressure loss of the gas flowing from the gas supply hole 2a to the gas inlet section.

Further, at opposite ends of the gas flow grooves 4a, a shallow gas flow inlet 8a and a shallow gas flow outlet 8b are provided for pressure loss function of the gas flow.

However, in the conventional technique, in order to suitably achieve the pressure loss in the gas which flows from the gas supply hole 2a to the gas inlet section, the throttle section 6 and the blocks 7 need to be fabricated with a high degree of accuracy. Therefore, the production cost of the separator 1 is significantly high uneconomically.

Further, since a single electrolyte electrode assembly (MEA) is provided in each space between the adjacent separators 1. The reactant gases are not supplied to the electrolyte electrode assemblies under the same condition, and it is difficult to supply the reactant gases equally to each of the electrolyte electrode assemblies. As a result, the desired power generation performance cannot be achieved in the fuel cell stack as a whole.

SUMMARY OF THE INVENTION

A main object of the present invention is to provide a fuel cell and a fuel cell stack in which with simple and economical structure, it is possible to supply reactant gases to electrode surfaces of each of stacked electrolyte electrode assemblies.

The present invention relates to a fuel cell formed by stacking electrolyte electrode assemblies between separators. Each of the electrolyte electrode assemblies includes an anode, a cathode, and an electrolyte interposed between the anode and the cathode for pressure loss function of the gas flow.

Each of the separators comprises sandwiching sections, a plurality of bridges, and a reactant gas supply unit. The sandwiching sections sandwich the electrolyte electrode assemblies. At least a fuel gas inlet for supplying a fuel gas along an electrode surface of the anode or an oxygen-containing gas inlet for supplying an oxygen-containing gas along an electrode surface of the cathode is formed in each of the sandwiching sections. The bridges are connected to the sandwiching sections. Each of the bridges has a reactant gas supply channel for supplying the fuel gas to the fuel gas inlet or supplying the oxygen-containing gas to the oxygen-containing gas inlet. The reactant gas supply unit is connected to the bridges. A reactant gas supply passage for supplying the fuel gas or the oxygen-containing gas to the reactant gas supply channel extends through the reactant gas supply unit in a stacking direction.

Further, a pressure loss generator mechanism is provided in the reactant gas supply channel. The pressure loss generator mechanism generates a pressure loss over the entire reactant gas supply channel for distributing the fuel gas or the oxygen-containing gas equally to each of the electrolyte electrode assemblies.

Further, according to another aspect of the present invention, a pressure loss generator mechanism is provided in the reactant gas supply channel, and the pressure loss generator mechanism generates a pressure loss partially in the reactant gas supply channel for distributing the fuel gas or the oxygen-containing gas equally to each of the electrolyte electrode assemblies.

Further, the present invention relates to a fuel cell stack formed by stacking a plurality of fuel cells. Each of the fuel cells is formed by stacking electrolyte electrode assemblies between separators. Each of the electrolyte electrode assemblies includes an anode, a cathode, and an electrolyte interposed between the anode and the cathode.

Further, a pressure loss generator mechanism is provided in the reactant gas supply channel, and the pressure loss generator mechanism generates a pressure loss over the entire reactant gas supply channel for distributing the fuel gas or the oxygen-containing gas equally to each of the electrolyte electrode assemblies disposed in the surface direction and the stacking direction.

Further, according to another aspect of the present invention, a pressure loss generator mechanism is provided in the reactant gas supply channel, and the pressure loss generator mechanism generates a pressure loss partially in the reactant gas supply channel for distributing the fuel gas or the oxygen-containing gas equally to each of the electrolyte electrode assemblies disposed in the surface direction and the stacking direction.

In the present invention, errors in the pressure loss generated depending on the cross sectional shape of the reactant gas supply channel can be absorbed by the elongated reactant gas supply channel. Thus, in comparison with the structure in which the pressure loss in the fuel gas is adjusted only by the opening cross sectional area of the reactant gas supply channel, the opening cross sectional area is large, and the influence of the fabrication errors becomes relatively small. Thus, the reactant gas supply channel is not essentially fabricated highly accurately. As a result, the number of fabrication steps is reduced, and the production cost is effectively reduced economically.

Further, it is possible to distribute the reactant gases equally to each of the electrolyte electrode assemblies, and the power generation performance of the fuel cells is improved as a whole. Further, it is possible to distribute the reactant gas equally to each of the electrolyte electrode assemblies arranged in the stacking direction of the separators, and the power generation of the fuel cell stack is improved as a whole.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
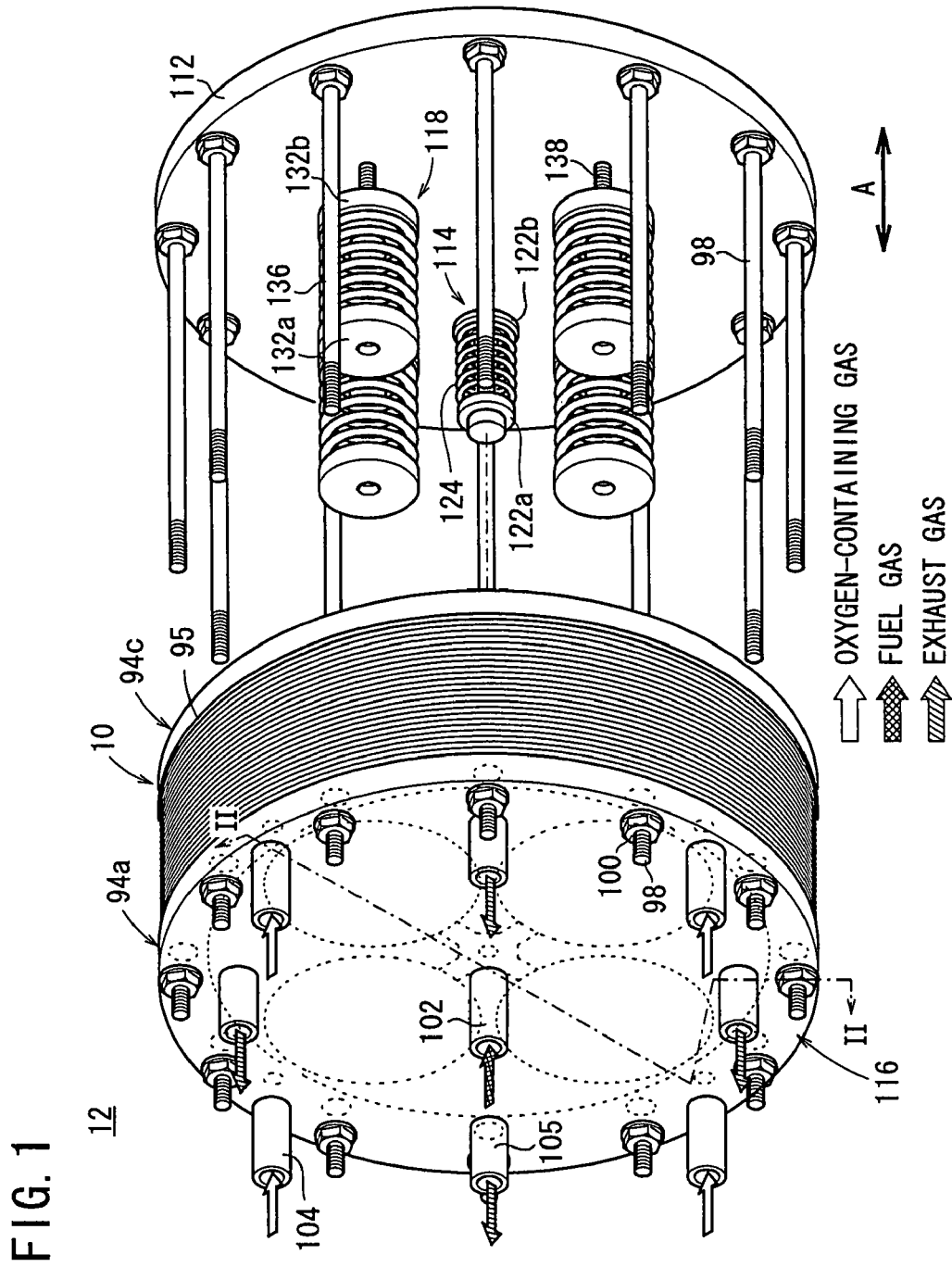
FIG. 1 is a perspective view schematically showing a fuel cell stack formed by stacking fuel cells according to a first embodiment of the present invention.
Figure 2:
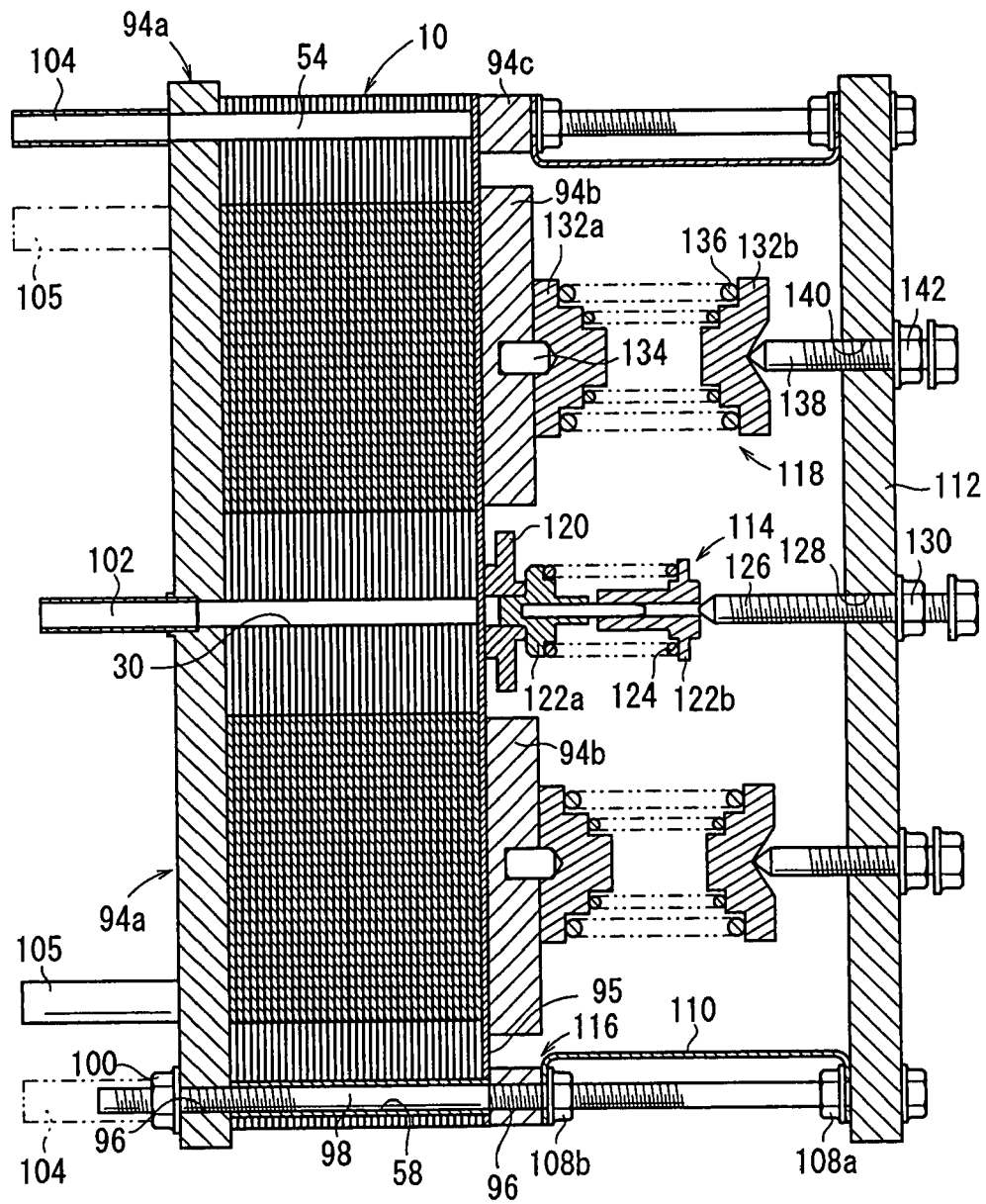
FIG. 2 is a cross sectional view showing the fuel cell stack taken along a line II-II in FIG. 1.

FIG. 1 is a perspective view schematically showing a fuel cell stack 12 formed by stacking fuel cells 10 according to a first embodiment of the present invention in a direction indicated by an arrow A. FIG. 2 is a cross sectional view showing the fuel cell stack 12 taken along a line II-II in FIG. 1.

Figure 3:
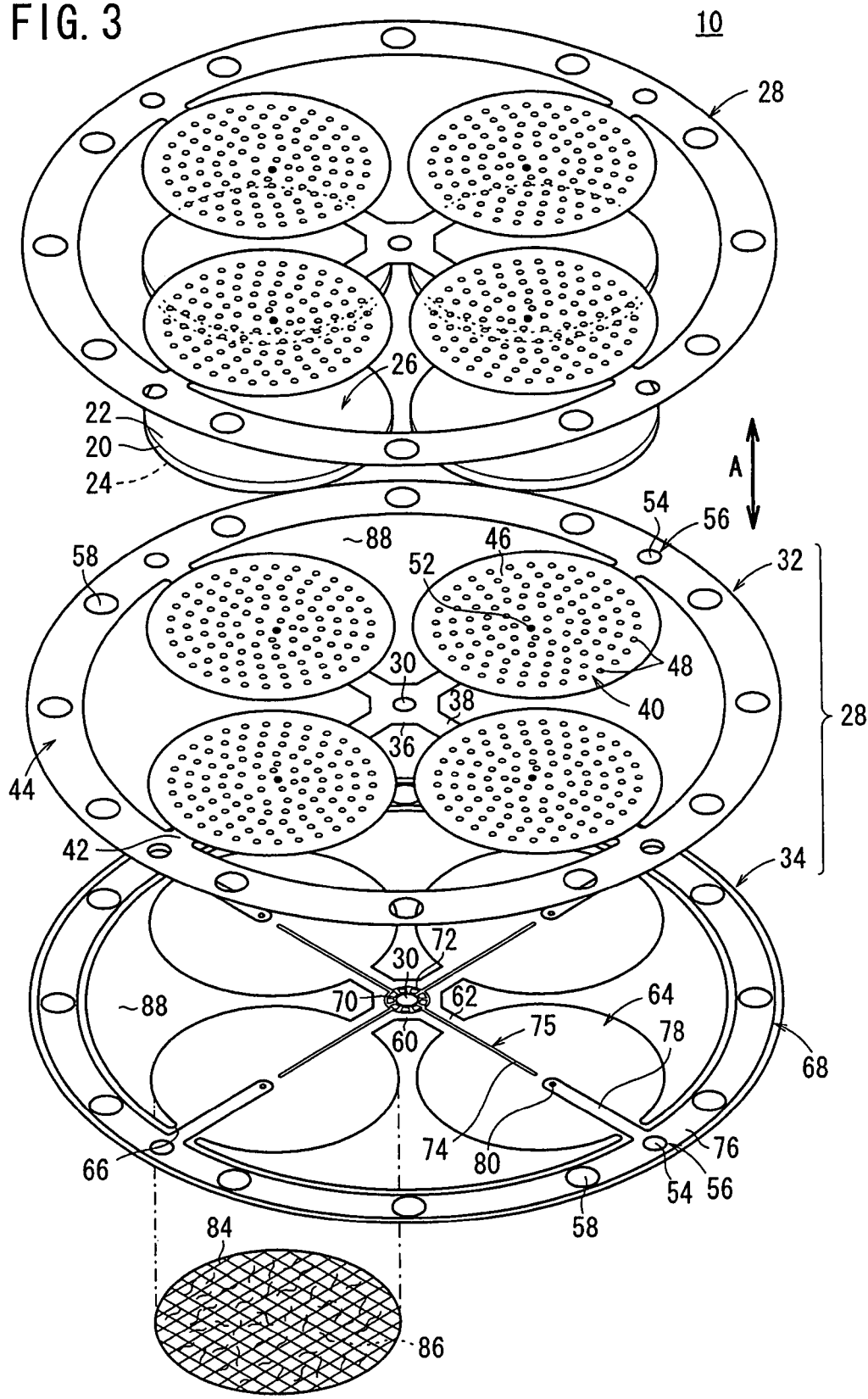
FIG. 3 is an exploded perspective view showing the fuel cell.
Figure 4:
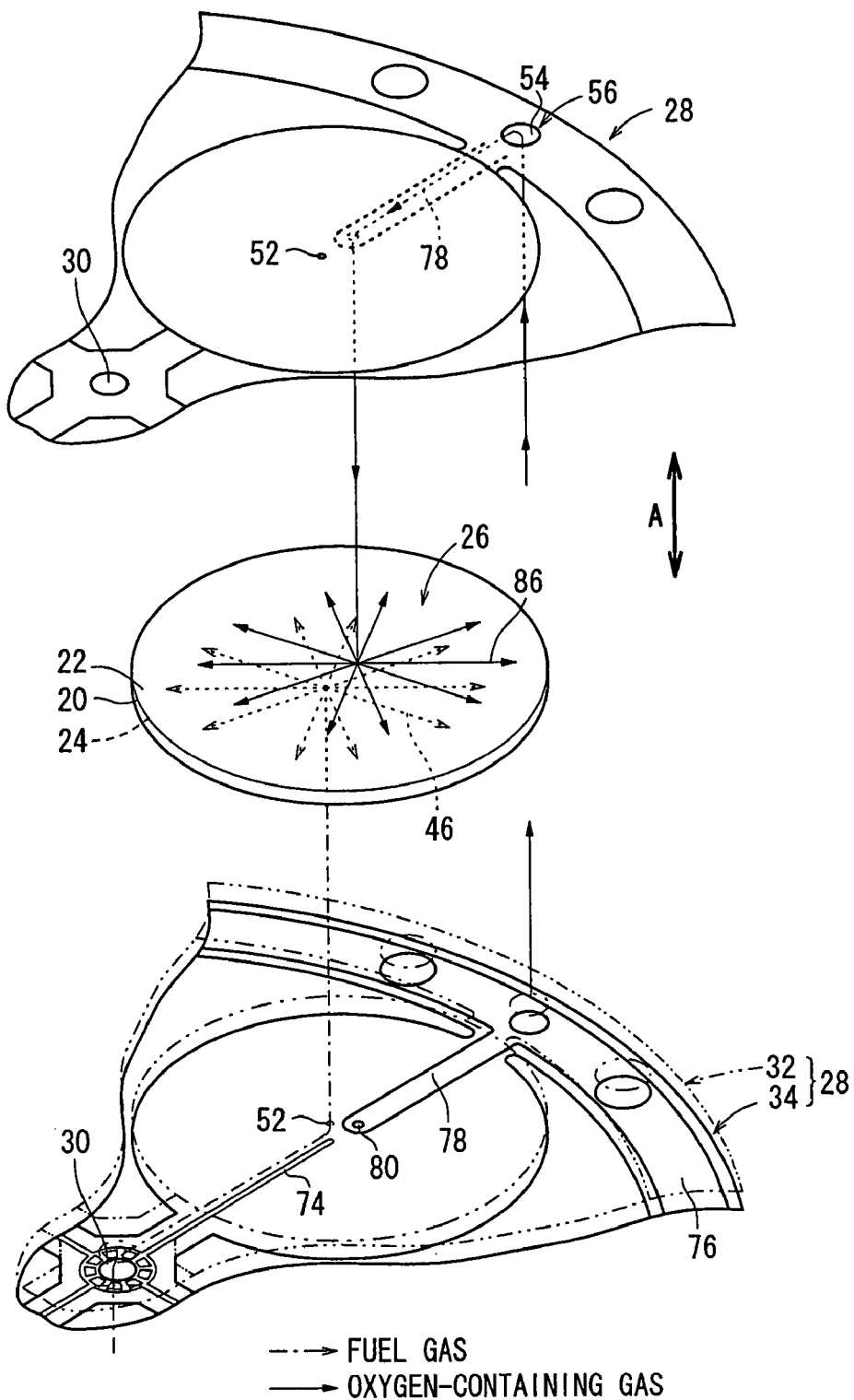
FIG. 4 is a partial exploded perspective view showing gas flows in the fuel cell.

The fuel cell 10 is used in various applications, including stationary and mobile applications. For example, the fuel cell 10 is mounted on a vehicle. The fuel cell 10 is a solid oxide fuel cell (SOFC). As shown in FIGS. 3 and 4, the fuel cell 10 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape.

As shown in FIG. 3, the fuel cell 10 is formed by sandwiching a plurality of, e.g., four electrolyte electrode assemblies 26 between a pair of separators 28. The four electrolyte electrode assemblies 26 are provided around a fuel gas supply passage 30 extending through the center of the separators 28, at predetermined intervals (angles) along a virtual circle concentrically with the fuel gas supply passage 30.

Each of the separators 28 includes first and second plates 32, 34. The first and second plates 32, 34 are metal plates of, e.g., stainless alloy. For example, the first plate 32 and the second plate 34 are joined to each other by diffusion bonding, laser welding, or brazing. Instead of the metal plates, for example, carbon plates may be used as the first plate 32 and the second plate 34 (description regarding the method of joining the first plate 32 and the second plate 34 is omitted).

Figure 5:
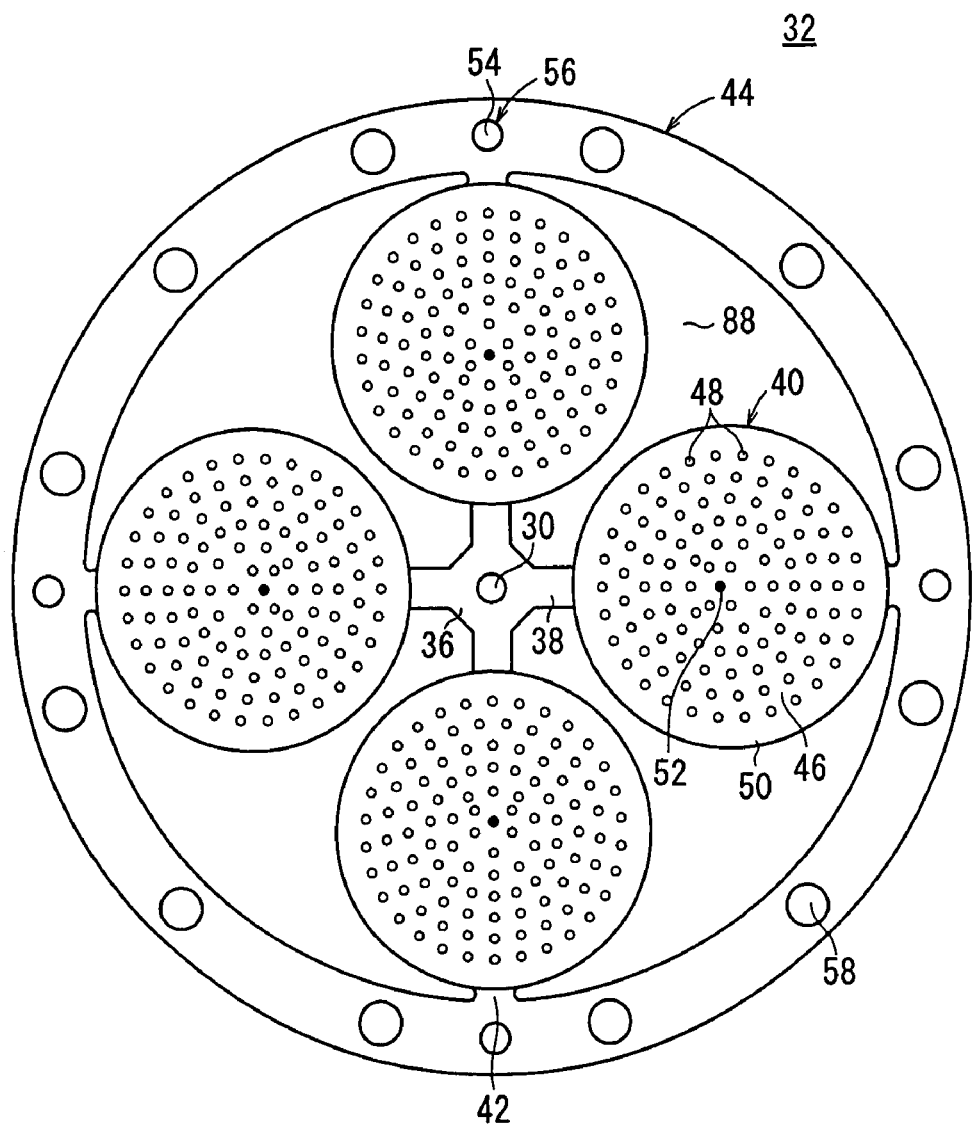
FIG. 5 is a view showing a first plate of the separator.

As shown in FIGS. 3 and 5, a first fuel gas supply unit (reactant gas supply unit) 36 is formed at the center of the first plate 32. The fuel gas supply passage (reactant gas supply passage) 30 extends through the first fuel gas supply unit 36, for supplying a fuel gas in the stacking direction indicated by the arrow A. Four first bridges 38 extend radially outwardly from the first fuel gas supply unit 36 at equal intervals. The first fuel gas supply unit 36 is integral with first sandwiching sections 40 each having a relatively large diameter. The first sandwiching section 40 and the electrolyte electrode assembly 26 have substantially the same size. The first sandwiching sections 40 are integral with an annular first case unit 44 through short second bridges 42.

Each of the first sandwiching sections 40 has a plurality of projections 48 on a surface which contacts the anode 24. The projections 48 form a fuel gas channel 46 for supplying a fuel gas along an electrode surface of the anode 24. The projections 48 function as a current collector. A fuel gas inlet 52 for supplying the fuel gas is formed at substantially the center of the first sandwiching section 40, at a position deviated toward the fuel gas supply passage 30 for supplying the fuel gas toward the substantially central region of the anode 24.

The first case unit 44 includes oxygen-containing gas supply units (reactant gas supply units) 56. The oxygen-containing gas supply passages (reactant gas supply passages) 54 extend through the oxygen-containing gas supply units 56 in the stacking direction, for supplying an oxygen-containing gas to oxygen-containing gas supply channels 78 as described later. A plurality of bolt insertion holes 58 are formed in the first case unit 44 at predetermined intervals (angles). The fuel gas supply passage 30, the first bridge 38, the first sandwiching section 40, the second bridge 42, and the oxygen-containing gas supply passage 54 are arranged in a straight line along the separator surface.

Figure 6:
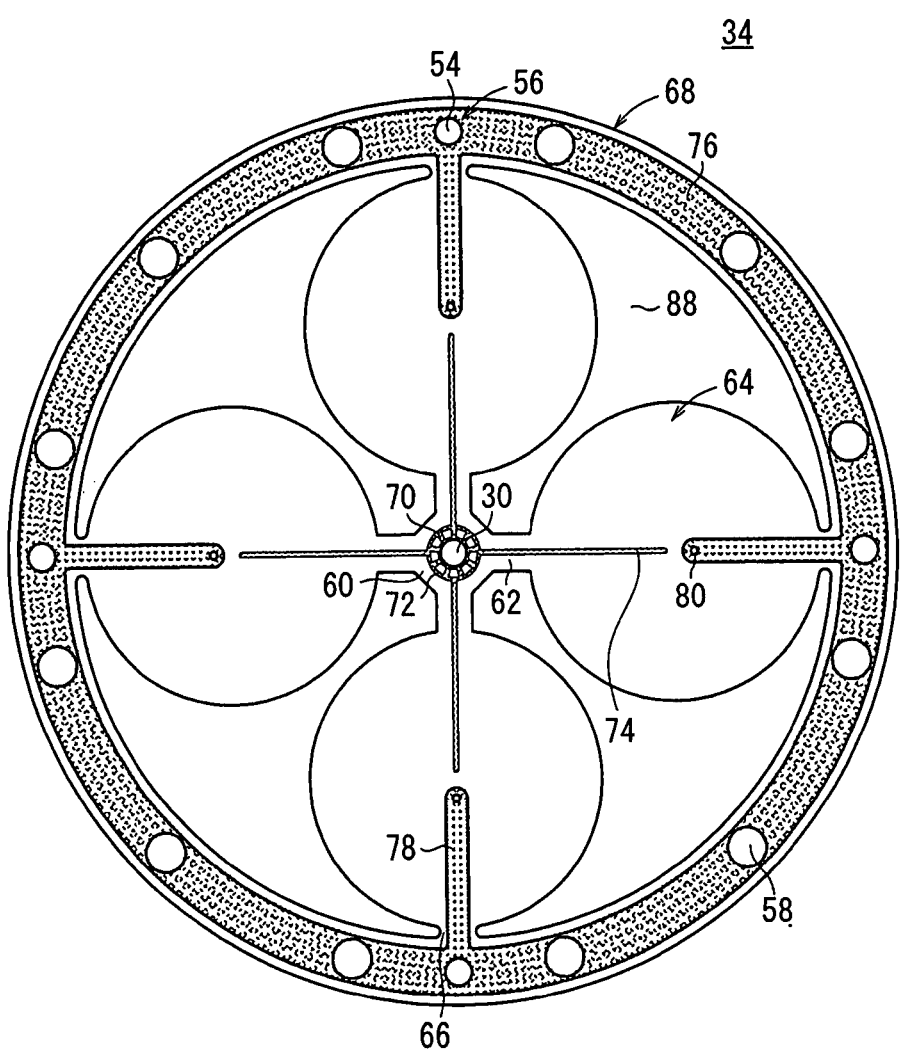
FIG. 6 is a view showing a second plate of a separator.

As shown in FIGS. 3 and 6, a second fuel gas supply unit (reactant gas supply unit) 60 is formed at the center of the second plate 34, and the fuel gas supply passage 30 extends through the center of the second fuel gas supply unit 60. Four first bridges 62 extend radially outwardly from the second fuel gas supply unit 60 at predetermined intervals (angles), and the second fuel gas supply unit 60 is integral with the second sandwiching sections 64 each having a relatively large diameter through the four first bridges 62. As in the case of the first sandwiching section 40, the second sandwiching section 64 and the electrolyte electrode assembly 26 have substantially the same size. Each of the second sandwiching sections 64 is integral with an annular second case unit 68 through a short second bridge 66.

A plurality of grooves 70 connected to the fuel gas supply passage 30 is formed radially around the fuel gas supply passage 30, on a surface of the second fuel gas supply unit 60 which is joined to the first fuel gas supply unit 36. The grooves 70 are connected to a circular groove 72, and the circular groove 72 is connected to four fuel gas supply channels (reactant gas supply channels) 74. Each of the fuel gas supply channels 74 extends from the first bridge 62 to a position near substantially the center of the second sandwiching section 64, and terminates at the fuel gas inlet 52 of the first plate 32.

Figure 7:
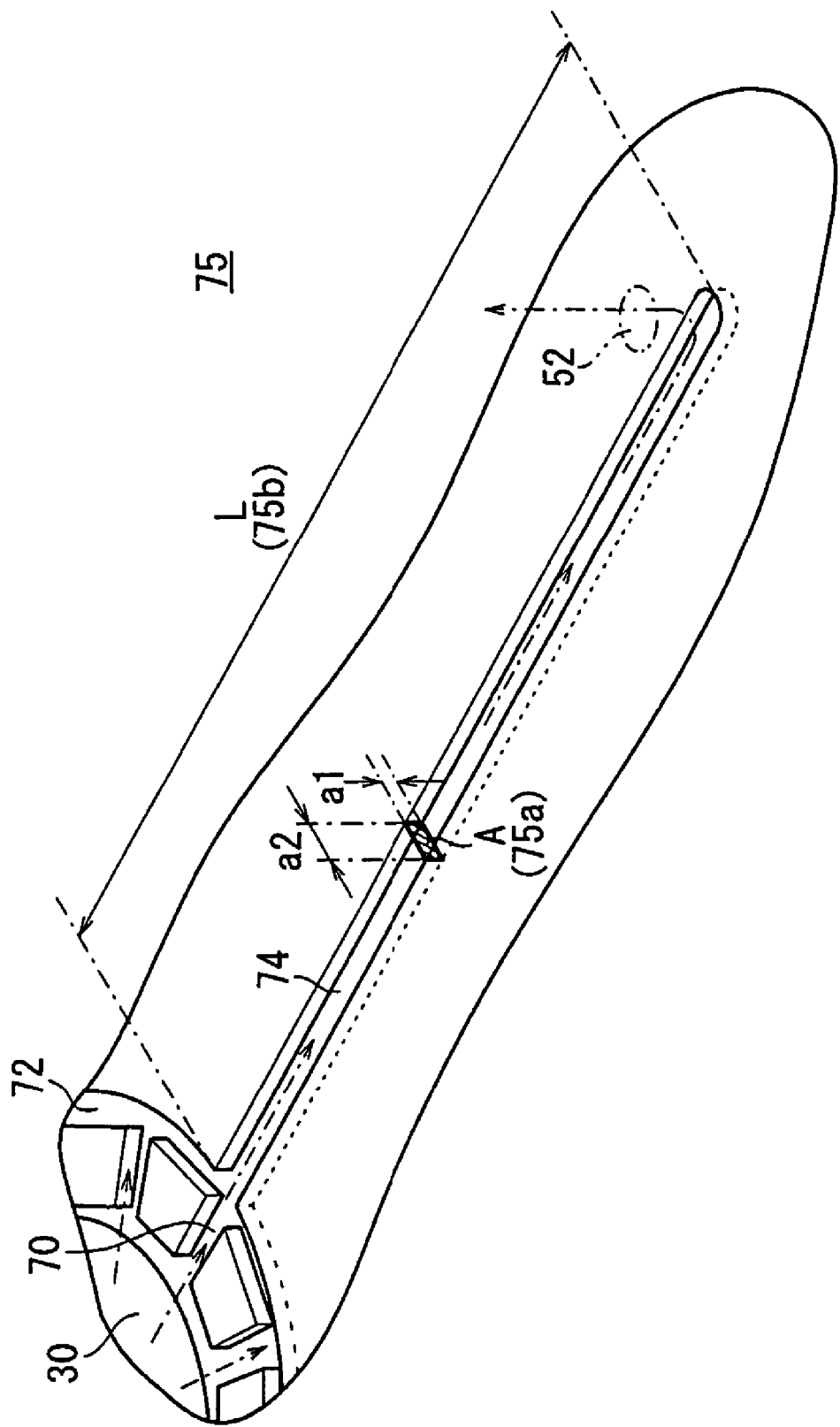
FIG. 7 is a perspective view schematically showing a pressure loss generator mechanism provided in a fuel gas supply channel.

A pressure loss generator mechanism 75 is provided in the fuel gas supply channel 74. The pressure loss generator mechanism 75 generates a pressure loss over the entire fuel gas supply channel 74 to distribute even fuel gas to each electrolyte electrode assembly 26. As shown in FIG. 7, the pressure loss generator mechanism 75 includes a first pressure loss generator section 75a and a second pressure loss generator section 75b. The first pressure loss generator section 75a generates pressure loss by reducing the opening cross sectional area (cross sectional area of the opening) A (a1×a2) of the fuel gas supply channel 74 in comparison with the opening cross sectional area of the fuel gas supply passage 30. The second pressure loss generator section 75b generates pressure loss by fabricating the fuel gas supply channel 74 to have a sufficient length, specifically, by satisfying the relationship: $D/L \leq 0.1$ where L is a length L in the fuel gas supply channel 74, and D is a characteristic length in the opening cross sectional area A of the fuel gas supply channel 74.

The characteristic length D herein is defined as follows:

The cross section in the opening is replaced with a virtual circle having an area equal to the opening cross sectional area A, and then, the diameter calculated based on the area of the virtual circle is determined as the characteristic length D. The characteristic length D is calculated by $D=2\sqrt{(A/\pi)}$.

As shown in FIG. 3, the second case unit 68 includes oxygen-containing gas supply units 56 and bolt insertion holes 58. The oxygen-containing gas supply passages 54 extend through the oxygen-containing gas supply units 56 in the stacking direction. The second case unit 68 has a filing chamber 76 on a surface joined to the first case unit 44, and the filling chamber 76 is filled with the oxygen-containing gas supplied from the oxygen-containing gas supply passages 54 (see FIGS. 3 and 8).

The filing chamber 76 is connected to the oxygen-containing gas supply channels (reactant gas supply channels) 78. Each of the oxygen-containing gas supply channels 78 extends from the second bridge 66 to a position near substantially the center of the second sandwiching section 64, and the front end of the oxygen-containing gas supply channel 78 is connected to an oxygen-containing gas inlet 80 passing through the second sandwiching section 64.

The first plate 32 has the projections 48 formed by, e.g., etching, and the second plate 34 has the grooves 70, the circular groove 72, the fuel gas supply channels 74, the filling chamber 76, and the oxygen-containing gas supply channels 78 formed by, e.g., etching.

As shown in FIG. 3, a deformable elastic channel unit such as an electrically conductive felt member (electrically conductive nonwoven fabric such as metal felt) 84 is provided on a surface of the second plate 34 facing the cathode 22. The felt member 84 forms an oxygen-containing gas channel 86 between the second sandwiching section 64 and the cathode 22. Instead of the felt member 84, for example, a mesh member (electrically conductive fabric such as metal mesh), foamed metal, expanded metal, punching metal, or pressure embossed metal may be used. Exhaust gas channels 88 are provided around the electrolyte electrode assemblies 26 for discharging the fuel gas and the oxygen-containing gas after reaction as an exhaust gas.

Figure 8:
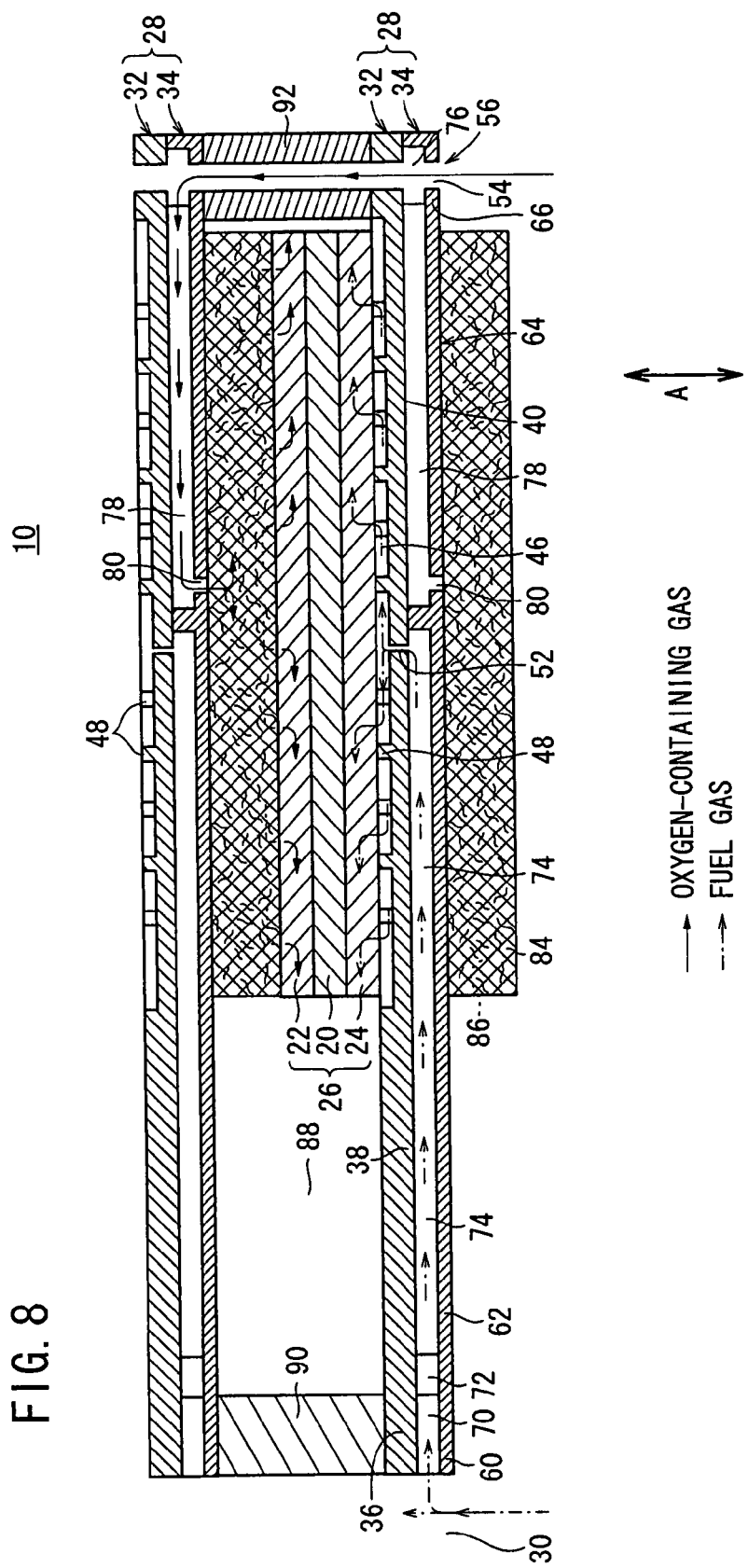
FIG. 8 is a cross sectional view schematically showing operation of the fuel cell.

As shown in FIG. 8, a first insulating seal 90 for sealing the fuel gas supply passage 30 and a second insulating seal 92 for sealing the oxygen-containing gas supply passage 54 are formed between the separators 28. The first insulating seal 90 and the second insulating seal 92 having good sealing performance are hard, and cannot be collapsed easily. For example, crustal component material, glass material, and composite material of clay and plastic may be used for the first insulating seal 90 and the second insulating seal 92. Further, preferably, the second insulating seal 92 is a heat insulating member for preventing diffusion of heat energy.

As shown in FIGS. 1 and 2, the fuel cell stack 12 is formed by providing a first end plate 94a having a substantially circular disk shape, at one end of the fuel cells 10 in the stacking direction, and a plurality of second end plates 94b each having a small diameter and a substantially circular disk shape, and a fixing ring 94c having a large diameter and a substantially ring shape, at the other end of the fuel cells 10 via a partition wall 95 in the stacking direction. The partition wall 95 functions to prevent diffusion of the exhaust gas to the outside of the fuel cells 10. The second end plates 94b are provided at four positions corresponding to positions where the electrolyte electrode assemblies 26 are stacked.

The first end plate 94a and the fixing ring 94c have a plurality of holes 96 connected to the bolt insertion holes 58 of the separators 28. By bolts 98 inserted through the holes 96 into the bolt insertion holes 58, and nuts 100 fitted to the bolts 98, the first case units 44 and the second case units 68 of the separators 28 are fixedly tightened to the first end plate 94a.

One fuel gas supply pipe 102 connected to the fuel gas supply passage 30, four oxygen-containing gas supply pipes 104 connected to the oxygen-containing gas supply passages 54, and four exhaust gas discharge pipes 105 connected to the exhaust gas channels 88 are provided at the first end plate 94a.

The first end plate 94a is fixed to a support plate 112 through bolts 98, nuts 108a, 108b, and plate collar members 110. A first load applying unit 114 for applying a tightening load to the first fuel gas supply unit 36 and the second fuel gas supply unit 60, second load applying units 116 for applying a tightening load to the oxygen-containing gas supply units 56, and third tightening load applying units 118 for applying a tightening load to the electrolyte electrode assemblies 26 are provided between the support plate 112 and the first end plate 94a.

The first tightening load applying unit 114 has a presser member 120 provided at the center of the fuel cells 10 (center of the first fuel gas supply unit 36 and the second fuel gas supply unit 60) for preventing leakage of the fuel gas from the fuel gas supply passage 30. The presser member 120 is provided near the center of the four second end plates 94b for pressing the fuel cells 10 through the partition wall 95. A first spring 124 is provided at the presser member 120 through a first receiver member 122a and a second receiver member 122b. The first presser bolt 126 is screwed into a first hole 128 formed in the support plate 112. The position of the first presser bolt 126 is adjustable through a first nut 130.

Each of the second load applying units 116 includes a bolt 98 inserted through the hole 96 into the bolt insertion hole 58, and the nut 100 fitted to the bolt 98. The second load tightening unit 116 prevents leakage of the oxygen-containing gas from the oxygen-containing gas supply unit 56.

Each of the third load applying units 118 includes a third receiver member 132a at the second end plate 94b, corresponding to each of the electrolyte electrode assemblies 26. The third receiver member 132a is positioned and supported on the second end plate 94b through the pin 134. One end of the second spring 136 contacts the third receiver member 132a and the other end of the second spring 136 contacts the fourth receiver member 132b. A tip end of the second presser bolt 138 contacts the fourth receiver member 132b. The second presser bolt 138 is screwed into the second screw hole 140 formed in the support plate 112. The position of the second presser bolt 138 is adjustable through the second nut 142.

Operation of the fuel cell stack 12 will be described below.

As shown in FIGS. 1 and 2, the fuel gas is supplied through the fuel gas supply pipe 102 to the first end plate 94a. Then, the fuel gas flows into the fuel gas supply passage 30. The air as the oxygen-containing gas is supplied from the oxygen-containing gas supply pipes 104 to the first end plate 94a. Then, the oxygen-containing gas flows into the oxygen-containing gas supply units 56.

As shown in FIGS. 4 and 8, the fuel gas supplied to the fuel gas supply passage 30 flows in the stacking direction indicated by the arrow A, and the fuel gas is supplied from the grooves 70 to each fuel gas supply channel through the circular groove 72 formed in the second plate 34 of the separator 28 of each fuel cell 10. After the fuel gas flows along each fuel gas supply channel 74, the fuel gas flows through the fuel gas inlet 52 formed in the first plate 32 to the fuel gas channel 46.

The fuel gas inlet 52 is provided at substantially the central position of the anode 24 of each electrolyte electrode assembly 26. Thus, the fuel gas is supplied from the fuel gas inlet 52 to the anode 24, and flows along the fuel gas channel 46 from the substantially central region to the outer circumferential region of the anode 24.

The air supplied to the oxygen-containing gas supply units 56 temporarily fills the filling chamber 76 provided between the first case unit 44 of the first plate 32 and the second case unit 68 of the second plate 34. The filling chamber 76 is connected to the oxygen-containing gas supply channel 78. The oxygen-containing gas moves toward the center of the first sandwiching sections 40 and the second sandwiching sections 64 along the oxygen-containing gas supply channels 78.

The oxygen-containing gas inlet 80 is opened to a position near the center of the second sandwiching section 64. The oxygen-containing gas inlet 80 is positioned at substantially the center of the cathode 22 of the electrolyte electrode assembly 26. Therefore, as shown in FIG. 8, the air is supplied from the oxygen-containing gas inlet 80 to the cathode 22. The oxygen-containing gas flows from the substantially central region to the outer circumferential region of the cathode 22 along the oxygen-containing gas channel 86 formed in the felt member 84.

Thus, in each of the electrolyte electrode assemblies 26, the fuel gas flows from substantially the central region to the outer circumferential region of the anode 24, and the air flows from the substantially central region to the outer circumferential region of the cathode 22 for generating electricity. The fuel gas and the air consumed in the power generation are discharged from the outer circumferential region of each of the electrolyte electrode assemblies 26, and flows through the exhaust gas channels 88.

In the first embodiment, as shown in FIG. 7, the pressure loss generator mechanism 75 is provided in the fuel gas supply channel 74. The pressure loss generator mechanism 75 includes the first pressure generator loss section 75a and the second pressure loss generator section 75b. The first pressure loss generator section 75a generates the pressure loss by reducing the opening cross sectional area A of the fuel gas supply channel 74 in comparison with the opening cross sectional area of the fuel gas supply passage 30. The second pressure loss generator section 75b generates the pressure loss by satisfying the relationship: $D/L \leq 0.1$ where L is a length L in the fuel gas supply channel 74, and D is a characteristic length in the opening cross sectional area A of the fuel gas supply channel 74.

In the structure, errors in the pressure loss generated depending on the cross sectional shape (within fabrication tolerance) or the like are absorbed by the pressure loss generated by increasing the length L as the total length of the fuel gas supply channel 74. The pressure loss in the fuel gas supplied from the fuel gas supply passage 30 to the fuel gas supply channel 74 is generated depending on the cross sectional area A in the fuel gas supply channel 74. Further, the pressure loss of the fuel gas is determined depending on the pressure loss generated by the length L of the fuel gas supply channel 74.

Thus, in comparison with the structure in which the pressure loss of the fuel gas is regulated by only the opening cross sectional area of the fuel gas supply channel 74, it is possible to enlarge the cross section in the opening. Since the influence due to errors in fabrication becomes relatively small, the high degree in accuracy in fabricating the fuel gas supply channel 74 may not be required. Thus, the number of steps in processing the fuel gas supply channel 74 is reduced, and the production cost is effectively reduced economically.

In the case where D/L is larger than 0.1, the pressure loss in the direction along the length of the second pressure loss generator section 75b is not sufficient. Therefore, it is not possible to absorb the influence due to the errors in fabrication (within fabrication tolerance) in the cross sectional shape of the fuel gas supply channel 74. That is, the pressure loss is not the same in each of the fuel gas supply channel 74, and it may not be possible to equally distribute the fuel gas to each of the electrolyte electrode assemblies 26.

Further, in the first embodiment, it is possible to equally distribute the fuel gas to the plurality of, e.g., four electrolyte electrode assemblies 26 sandwiched between the separators 28. Thus, the power generation performance is suitably improved in the fuel cells 10 as a whole.

In the fuel cell stack 12, it is possible to equally distribute the fuel gas to each of the fuel cells 10. That is, the fuel gas is equally distributed to each of the electrolyte electrode assemblies 26 of the stacked fuel cells 10. Improvement in the overall power generation performance in the fuel cell stack 12 is achieved easily.

Further, the first sandwiching sections 40 and the second sandwiching sections 64 (the electrolyte electrode assemblies 26) are provided at equal intervals (angles) around the fuel gas supply passage 30. In the structure, the fuel gas can be distributed equally from the fuel gas supply passage 30 to the electrolyte electrode assemblies 26. Improvement in the performance and stability in the power generation is achieved in each of the electrolyte electrode assemblies 26. Moreover, since the first sandwiching sections 40 and the second sandwiching sections 64 are provided highly symmetrically, heat distortion or the like is not generated significantly in the first sandwiching sections 40 and the second sandwiching sections 64.

Further, the electrolyte electrode assemblies 26 are arranged along a virtual circle concentric with the fuel gas supply passage 30. In the structure, the fuel gas can be distributed equally from the fuel gas supply passage 30 to each of the electrolyte electrode assemblies 26. Improvement in the performance and stability in the power generation is achieved in each of the electrolyte electrode assemblies 26. Even if any of the electrolyte electrode assemblies 26 is damaged, and does not function properly, power generation is performed by the other electrolyte electrode assemblies 26, and it is possible to continue power generation of the fuel cells 10 as a whole.

Further, the number of the first bridges 38 and the number of the first bridges 62 are the same as the number of the electrolyte electrode assemblies 26, and placed at equal intervals (angles) around the fuel gas supply passage 30. In the structure, it is possible to equally distribute the fuel gas from the fuel gas supply passage 30 to each of the electrolyte electrode assemblies 26 through the fuel gas supply channels 74 between the first bridges 38, 62. Improvement in the performance and stability in the power generation is achieved in each of the electrolyte electrode assemblies 26. Moreover, since the first bridges 38, 62 are provided highly symmetrically, heat distortion or the like is not suitably suppressed in the first bridges 38, 62.

In the first embodiment, the fuel gas supply passage 30 extends through the first fuel gas supply unit 36 and the second fuel gas supply unit 60 at the center of the separator 28. Alternatively, the oxygen-containing gas supply passage 54 may extend through the oxygen-containing gas supply unit 56 at the center of the separator 28.

Figure 9:
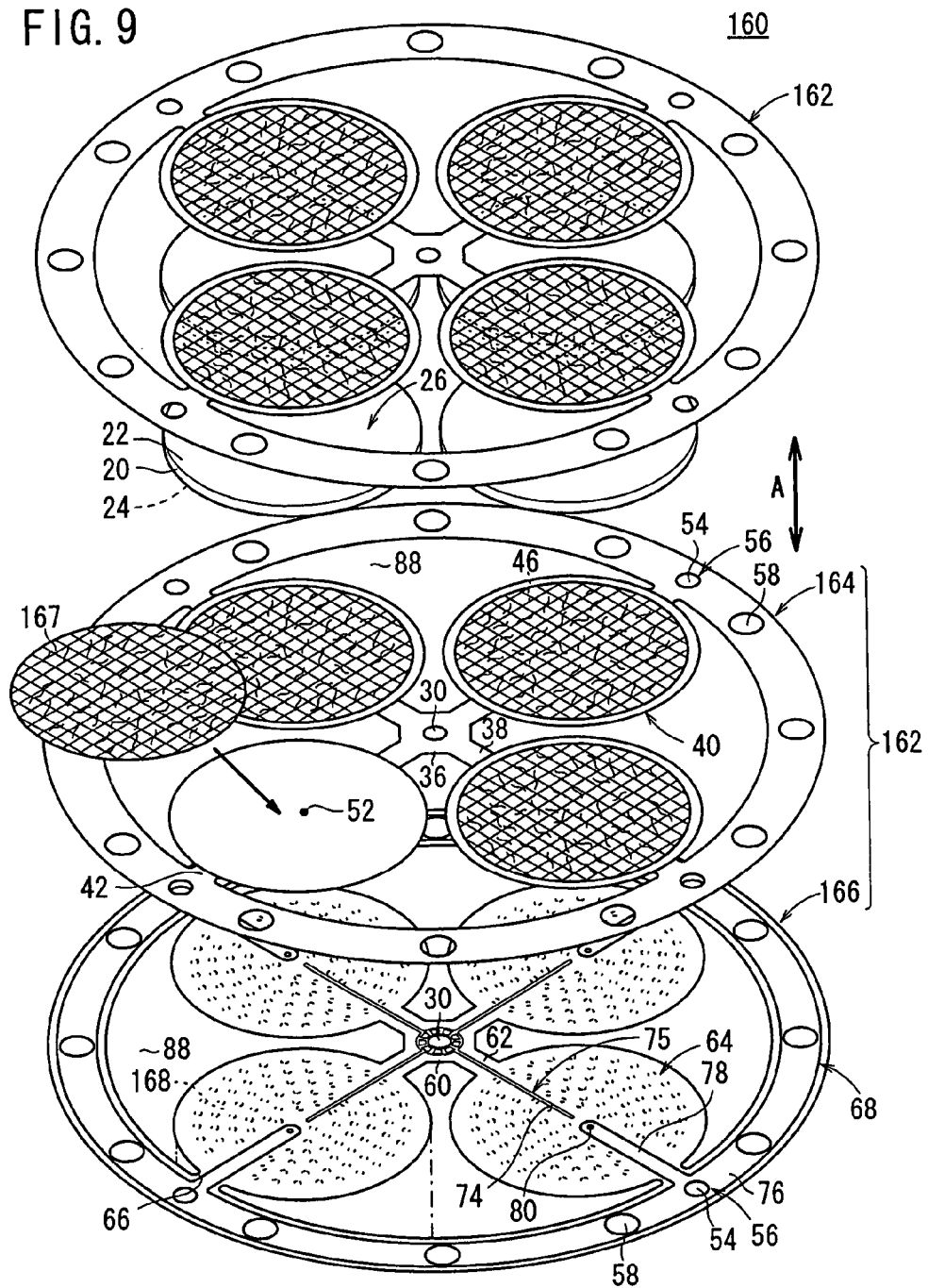
FIG. 9 is an exploded perspective view showing a fuel cell according to a second embodiment of the present invention.
Figure 10:
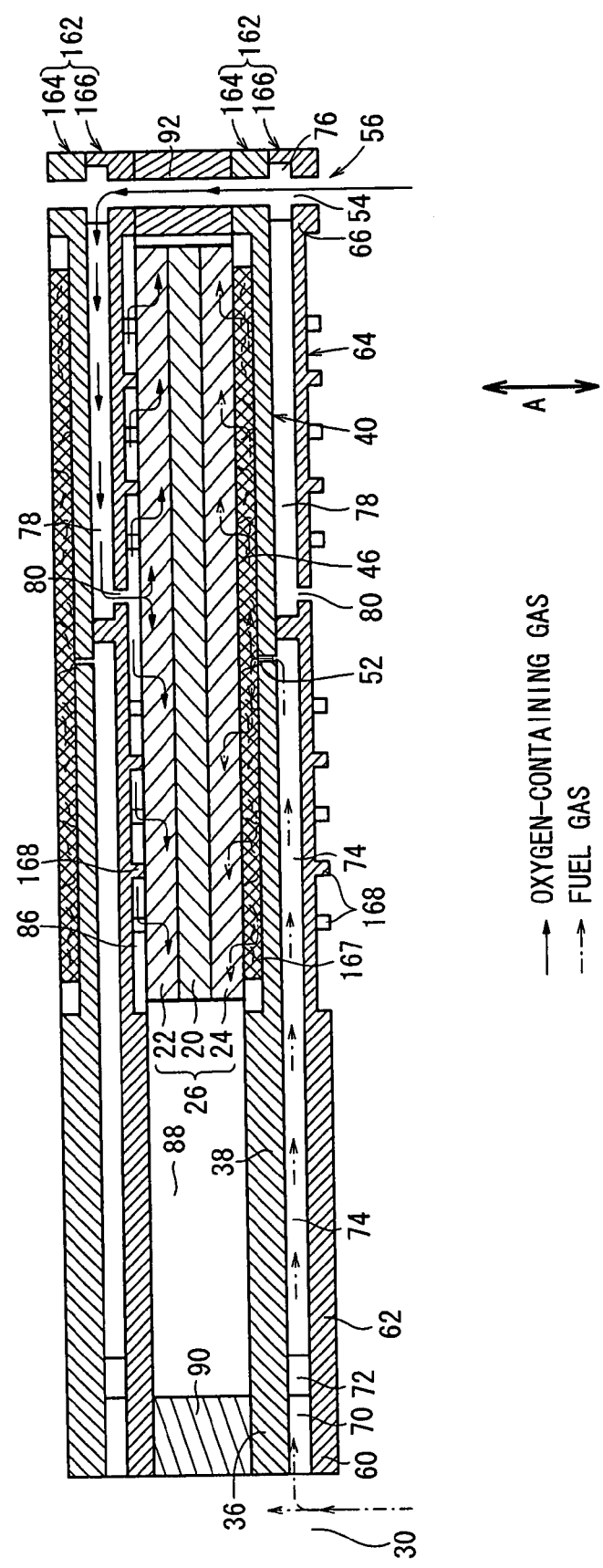
FIG. 10 is a cross sectional view schematically showing operation of the fuel cell.

FIG. 9 is an exploded perspective view showing a fuel cell 160 according to a second embodiment. FIG. 10 is a cross sectional view schematically showing operation of the fuel cell 160. The constituent elements that are identical to those of the fuel cell 10 according to the first embodiment are labeled with the same reference numeral, and description thereof will be omitted. Further, in third to fifth embodiments as described later, the constituent elements that are identical to those of the fuel cell 10 according to the first embodiment are labeled with the same reference numeral, and description thereof will be omitted.

The fuel cell 160 has a separator 162 including a first plate 164 and a second plate 166. Each of the first sandwiching sections 40 of the first plate 164 has a planar surface which contacts the electrolyte electrode assemblies 26, an electrically conductive felt member (electrical conductive nonwoven fabric such as metal felt) 167 is provided on the planar surface. The felt member 167 forms a fuel gas channel 46 for supplying the fuel gas along the electrode surface of the anode 24, and tightly contacts the anode 24 (see FIGS. 9 and 10). Instead of the electrically conductive felt member, for example, a mesh member (electrically conductive fabric such as metal mesh), foamed metal, expanded metal, punching metal, pressure embossed metal may be used.

The second plate 166 includes second sandwiching sections 64, and each of the second sandwiching sections 64 includes a plurality of projections 168 on a surface which contacts the cathode 22. The projections 168 form an oxygen-containing gas channel 86. The projections 168 are formed by, e.g., etching.

As described above, in the second embodiment, by deformation of the felt member 167, for example, the felt member 167 tightly contacts the anode 24 advantageously.

Figure 11:
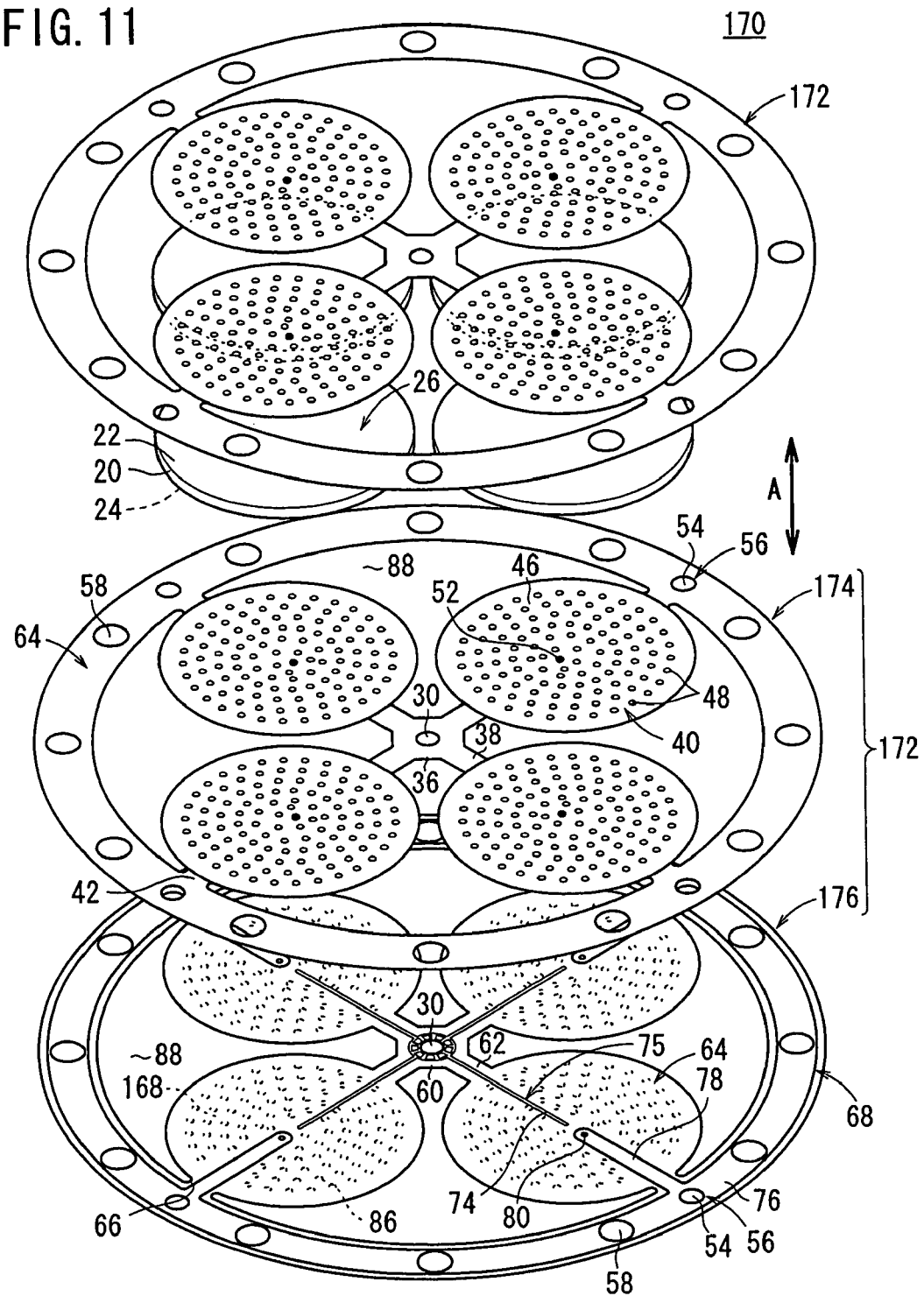
FIG. 11 is an exploded perspective view showing a fuel cell according to a third embodiment of the present invention.
Figure 12:
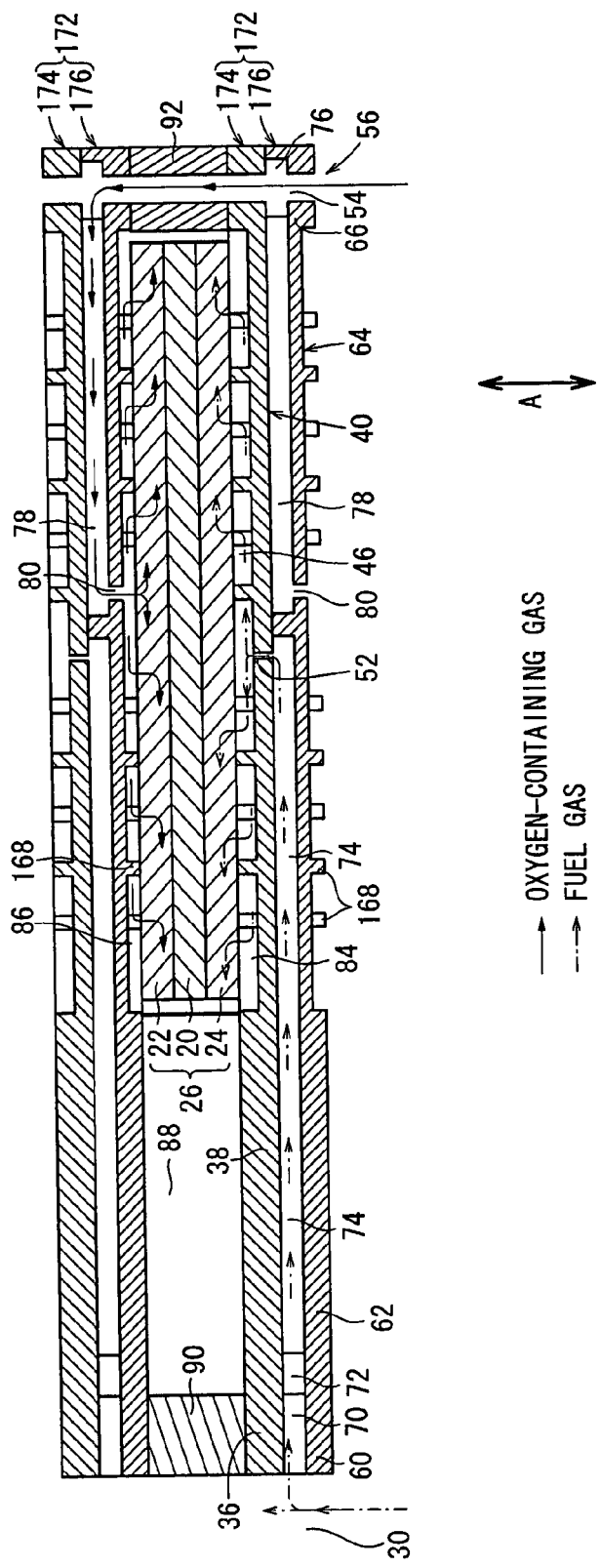
FIG. 12 is a cross sectional view schematically showing operation of the fuel cell.

FIG. 11 is an exploded perspective view schematically showing a fuel cell 170 according to a third embodiment of the present invention. FIG. 12 is a schematic cross sectional view schematically showing operation of the fuel cell 170.

The fuel cell 170 has a separator 172 including a first plate 174 and a second plate 176. A plurality of projections 48 are formed on a surface of each first sandwiching section 40 of the first plate 174 which contacts the anode 24. The projections 48 form the fuel gas channel 46. A plurality of projections 168 are formed on a surface of each second sandwiching section 64 of the second plate 176 which contacts the cathode 22. The projections 168 form the oxygen-containing gas channel 86.

In the third embodiment, the same advantages as in the cases of the first and second embodiments can be obtained. For example, distortion of the electrolyte electrode assemblies 26 and the separator 172 is reduced by the projections 48, 168, and the fuel gas and the oxygen-containing gas flow uniformly.

Structure of the first and second embodiments may be combined to use the felt member (electrically conductive nonwoven fabric such as metal felt) 84 forming the oxygen-containing gas channel 86 and the felt member (electrically conductive nonwoven fabric such as metal felt) 167 forming the fuel gas channel 46. Instead of the felt members 84, 167, for example, a mesh member (electrically conductive fabric such as metal mesh), foamed metal, expanded metal, punching metal, pressure embossed metal may be used.

Figure 13:
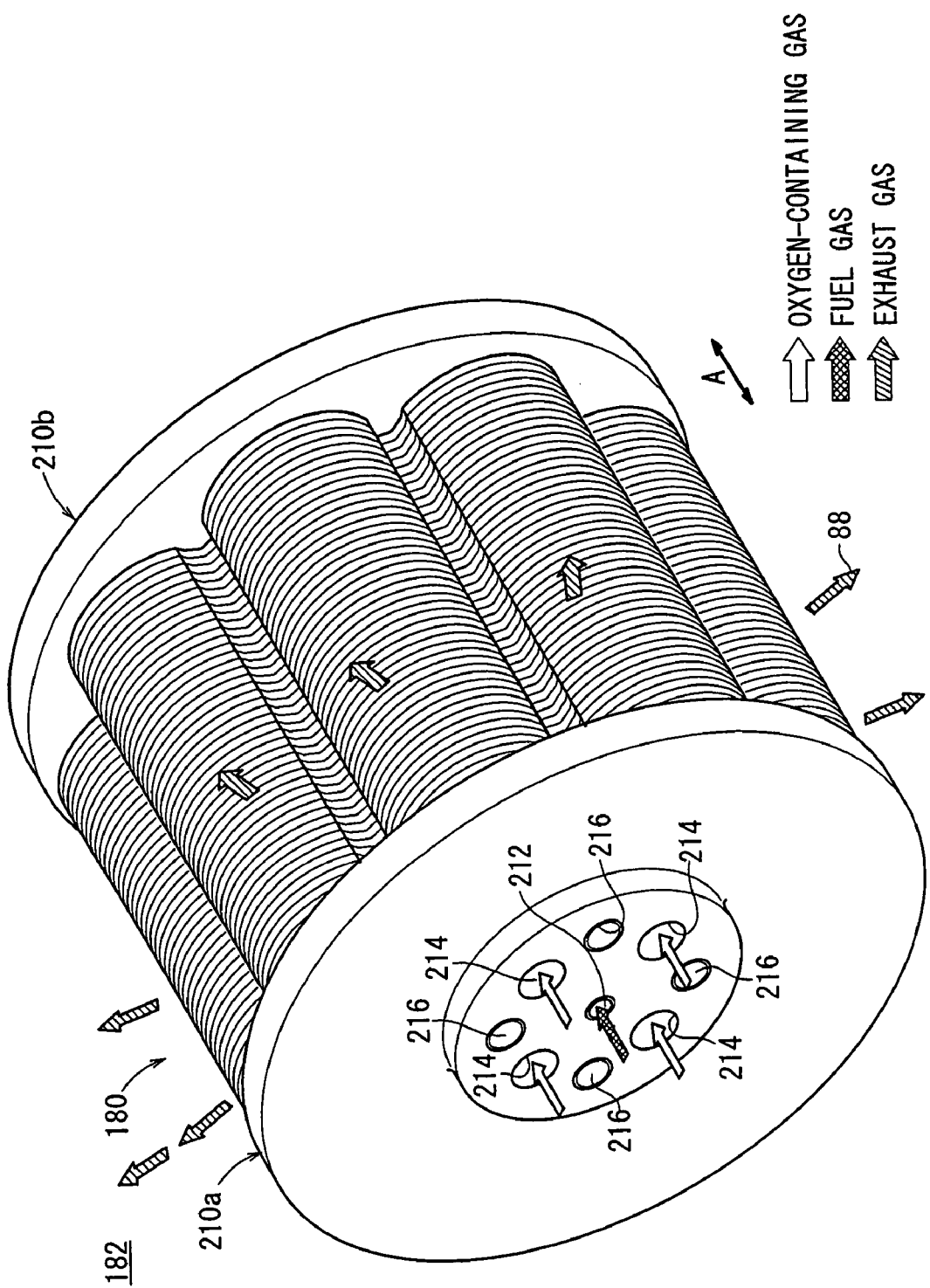
FIG. 13 is a perspective view schematically showing a fuel cell stack formed by stacking fuel cells in the direction shown by the arrow A according to a fourth embodiment of the present invention.

FIG. 13 is an exploded perspective view showing a fuel cell stack 182 formed by stacking fuel cells 180 according to a fourth embodiment of the present invention in a direction indicated by an arrow A.

A plurality of, e.g., eight electrolyte electrode assemblies 26 are sandwiched between a pair of separators 184 to form the fuel cell 180. The eight electrolyte electrode assemblies 26 are arranged along a virtual circle concentric with a fuel gas supply passage 30 extending through the center of the separators 184.

Figure 14:
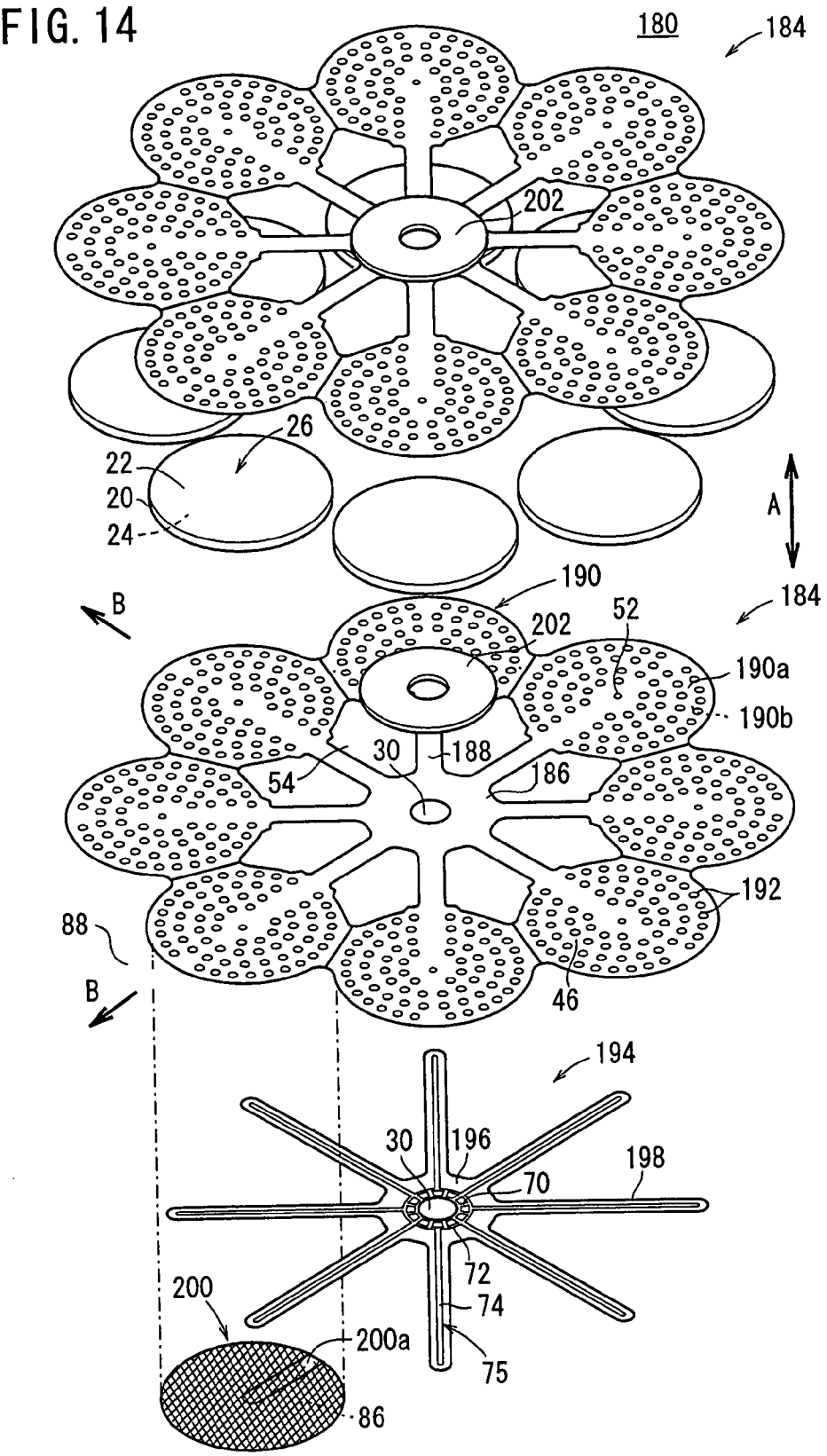
FIG. 14 is an exploded perspective view showing the fuel cell.
Figure 15:
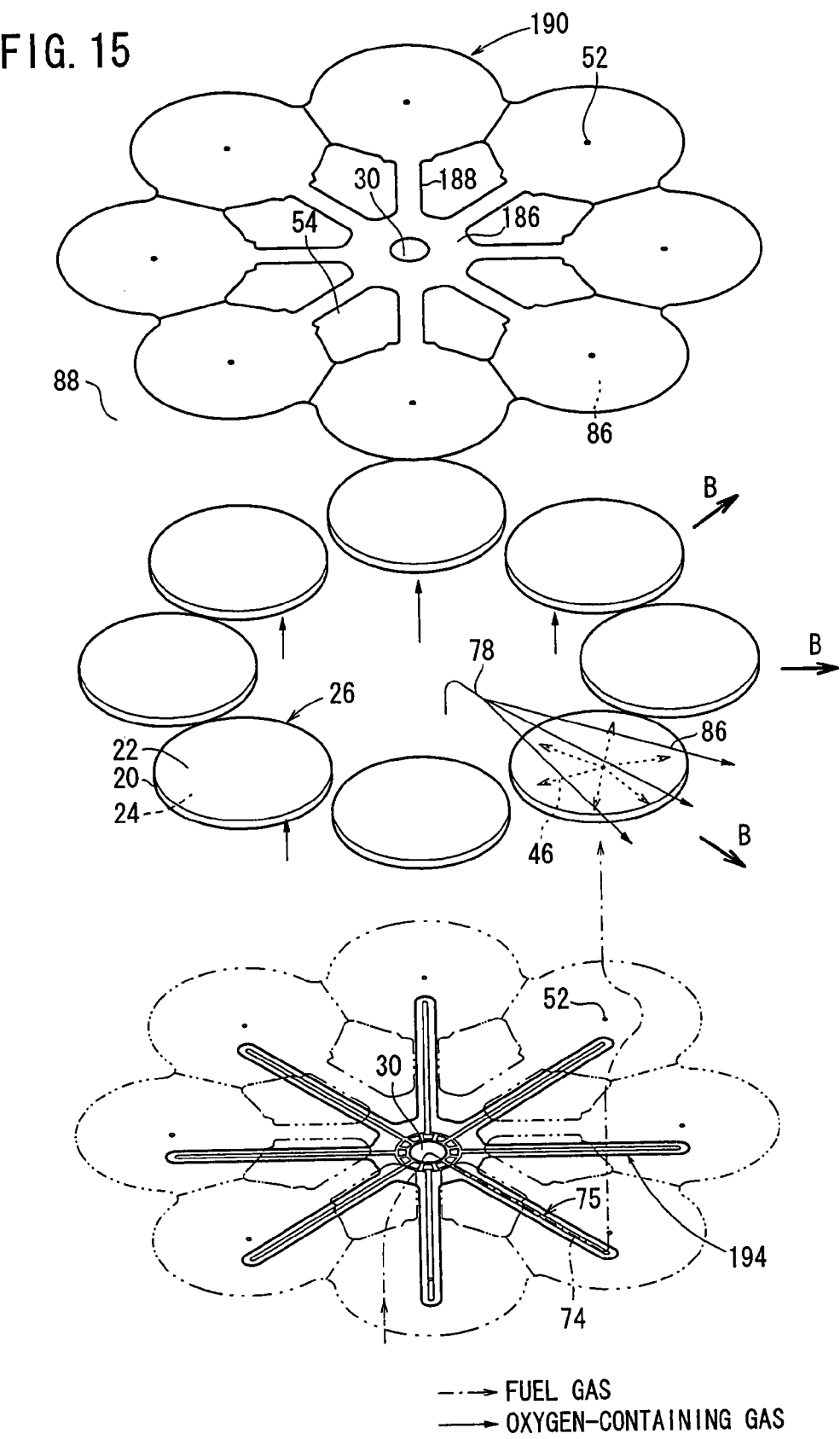
FIG. 15 is a partial exploded perspective view showing gas flows in the fuel cell.

As shown in FIG. 14, for example, each of the separators 184 comprises a single metal plate of, e.g., stainless alloy or a carbon plate. The separator 184 has a fuel gas supply unit (reactant gas supply unit) 186. The fuel gas supply passage 30 extends through the center of the fuel gas supply unit 186. The fuel gas supply unit 186 is integral with sandwiching sections 190 each having a relatively large diameter through a plurality of first bridges 188. The first bridges 188 extend radially outwardly from the fuel gas supply unit 186 at equal angles (intervals). The distances between the center of the fuel gas supply unit 186 and the centers of the sandwiching sections 190 are the same.

The sandwiching sections 190 and the electrolyte electrode assemblies 26 have the same size. A fuel gas inlet 52 for supplying the fuel gas is provided, e.g., at the center of the sandwiching section 190, or at a position deviated toward the upstream side of the center of the sandwiching section 190 in the flow direction of the oxygen-containing gas.

Each of the sandwiching sections 190 has a fuel gas channel 46 on a surface 190a which contacts the anode 24, for supplying a fuel gas along an electrode surface of the anode 24. The fuel gas channel 46 is formed by a plurality of projections 192 formed on the surface 190a of each of the sandwiching sections 190.

The projections 192 are made of solid portions formed by, e.g., etching, or hollow portions formed by pressure forming. The cross sectional shape of the projection 192 may take various shapes such as a rectangular shape, a circular shape, an oval shape, an ellipse shape, a triangular shape or a square shape. The position and density of the projections 192 can be changed arbitrarily depending on the flow state of the fuel gas or the like. The other projections as described below have the same structure as the projection 192. Each of the sandwiching sections 190 has a substantially planar surface 190b which contacts the cathode 22.

As shown in FIG. 14, a channel member 194 is fixed to a surface of the separator 184 facing the cathode 22, e.g., by brazing, diffusion bonding, laser welding, or the like. The channel member 194 has a planar plate shape. The channel member 194 has a fuel gas supply unit 196, and the fuel gas supply passage 30 extends through the center of the fuel gas supply unit 196. Eight second bridges 198 extend radially from the fuel gas supply unit 196. Each of the second bridges 198 is fixed to the separator 184 from the first bridge 188 to the surface 190b of the sandwiching section 190 to cover the fuel gas inlet 52 (see FIG. 16). From the fuel gas supply unit 196 to the second bridge 198, a fuel gas supply channel 74 connecting the fuel gas supply passage 30 to the fuel gas inlet 52 is formed. A pressure loss generator mechanism 75 is provided in the fuel gas supply channel 74.

A deformable elastic channel unit such as an electrically conductive mesh member (electrically conductive fabric such as metal mesh) 200 is provided on the surface 190b of the sandwiching section 190. The mesh member 200 forms an oxygen-containing gas channel 86 for supplying the oxygen-containing gas along an electrode surface of the cathode 22, and tightly contacts the cathode 22. Instead of the mesh member 200, for example, an electrically conductive felt member (electrically conductive nonwoven fabric such as metal felt), foamed metal, expanded metal, punching metal, or pressure embossed metal may be used.

For example, the mesh member 200 is made of a wire rod material such as stainless steel (SUS material), and has a circular disk shape. The thickness of the mesh member 200 is dimensioned such that, when a load in a stacking direction indicated by an arrow A is applied to the mesh member 200, the mesh member 200 is deformed elastically desirably to directly contact the surface 190b of the sandwiching section 190. The mesh member 200 has a cutout 200a for providing a space for the channel member 194 (see FIGS. 14 and 16).

The oxygen-containing gas channel 86 provided in the mesh member 200 is connected to the oxygen-containing gas supply passage 54 for supplying the oxygen-containing gas from a space between an inner circumferential edge of the electrolyte electrode assembly 26 and an inner circumferential edge of the sandwiching section 190 in a direction indicated by an arrow B. The oxygen-containing supply passage 54 extends inside the sandwiching sections 190 in the stacking direction indicated by the arrow A, between the respective first bridges 188.

Insulating seals 202 for sealing the fuel gas supply passage 30 are provided between the separators 184. For example, the insulating seals 202 are made of crustal component material such as mica material, glass material, or ceramic material.

As shown in FIG. 13, the fuel cell stack 182 includes substantially circular end plates 210a, 210b each having a circular disk shape at opposite ends of the fuel cells 180 in the stacking direction. At the center of the end plate 210a, a hole 212 corresponding to the fuel gas supply passage 30 is formed, and a plurality of holes 214 are formed around the hole 212, corresponding to the spaces of the oxygen-containing gas supply passage 54. The components between the end plates 210a, 210b are tightened together by bolts (not shown) screwed into the screw holes 216 in the direction indicated by the arrow A.

Next, operation of the fuel cell stack 182 will be described.

In assembling the fuel cell stack 182, firstly, as shown in FIG. 14, the channel member 194 is joined to a surface of the separator 184 facing the cathode 22. Thus, a fuel gas supply channel 74 connected to the fuel gas supply passage 30 is formed between the separator 184 and the channel member 194. The fuel gas supply channel 74 is connected to the fuel gas channel 46 through the fuel gas inlet 52 (see FIG. 16).

Further, ring shaped insulating seals 202 are provided between the separators 184 around the fuel gas supply passage 30. The eight electrolyte electrode assemblies 26 are sandwiched between the separators 184 to form the fuel cell 180.

The electrolyte electrode assemblies 26 are provided between the surfaces 190a, 190b of the separators 184 facing each other. The fuel gas inlet 52 is provided at substantially the center of each of the anodes 24. The mesh member 200 is interposed between the surface 190b of the separator 184 and the electrolyte electrode assembly 26. The channel member 194 is provided in the cutout 200a of the mesh member 200. A plurality of the fuel cells 10 are stacked in the direction indicated by the arrow A, and end plates 210a, 210b are provided at opposite ends in the stacking direction to form the fuel cell stack 182 (see FIG. 13).

Then, in the fuel cell stack 182, as shown in FIG. 13, the fuel gas is supplied from the hole 212 of the end plate 210a, and the air is supplied from the holes 214 to the oxygen-containing gas supply passage 54.

The fuel gas flows along the fuel gas supply passage 30 in the stacking direction indicated by the arrow A, and is supplied to the fuel gas supply channel 74 in each of the fuel cells 180. Thus, the fuel gas flows along the fuel gas supply channel 74 along the surface of the separator 184 in the direction indicated by the arrow B.

Figure 16:
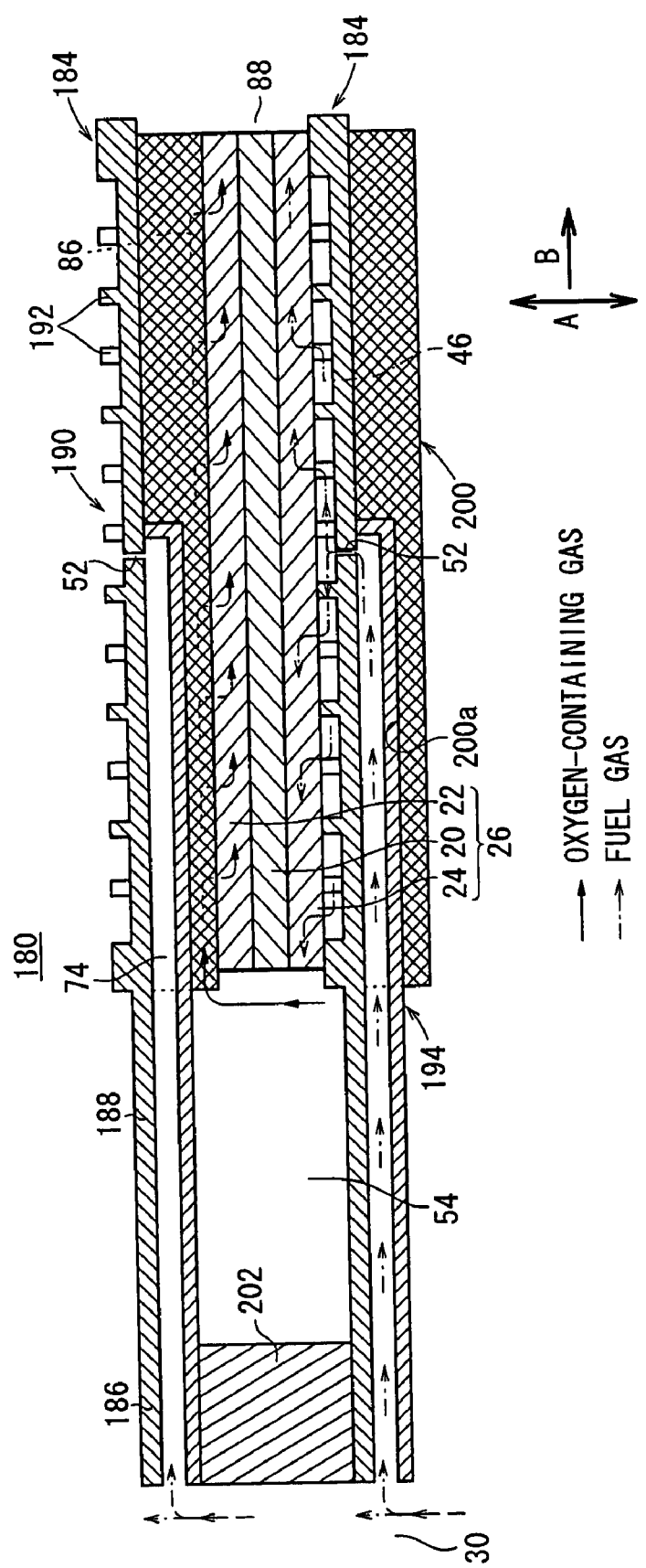
FIG. 16 is a cross sectional view schematically showing operation of the fuel cell.

As shown in FIG. 16, the fuel gas flows from the fuel gas supply channel 74 to the fuel gas channel 46 through the fuel gas inlet 52 formed in the sandwiching section 190. The fuel gas inlet 52 is provided at substantially the central position of the anode 24 of each of the electrolyte electrode assemblies 26. Thus, the fuel gas is supplied from the fuel gas inlet 52 to the substantially center of the anode 24. The fuel gas flows along the fuel gas channel 46 toward the outer circumferential region of the anode 24.

The air supplied to the oxygen-containing gas supply passage 54 flows into the space between the inner circumferential edge of the electrolyte electrode assembly 26 and the inner circumferential edge of the sandwiching section 190 in the direction indicated by the arrow B. The oxygen-containing gas is supplied to the oxygen-containing gas channel 86 formed in the mesh member 200. In the oxygen-containing gas channel 86, the air flows from the inner circumferential edge of the cathode 22 (center of the separator 184) to the outer circumferential edge of the cathode 22 (outer circumferential edge of the separator 184).

Thus, in the electrolyte electrode assembly 26, the fuel gas flows from the center to the outer circumferential side on the electrode surface of the anode 24, and the oxygen-containing gas flows in one direction indicated by the arrow B on the electrode surface of the cathode 22. At this time, oxide ions flow through the electrolyte 20 toward the anode 24 for generating electricity by electrochemical reactions.

The air after power generation reaction and the fuel gas after power generation reaction discharged from the outer circumferential region of each of the electrolyte electrode assemblies 26 flow into the exhaust gas channel 88 as the off gas, and is discharged from the fuel cell stack 182 (see FIG. 13).

In the fourth embodiment, the pressure loss generator mechanism 75 is provided in the fuel gas supply channel 74. In the structure, the pressure loss of the fuel gas is suitably and reliably generated in the fuel gas supply channel 74. Thus, the same advantages as in the cases of the first to third embodiments are obtained. For example, the number of steps of fabricating the fuel gas supply channel 74 is reduced, and the production cost is reduced effectively and economically.

In the fourth embodiment, as in the case of the first embodiment, the mesh member 200 (corresponding to the felt member 84) forming the oxygen-containing gas channel 86 is used. However, the present invention is not limited in this respect. For example, the felt member 167 forming the fuel gas channel 46 used in the second embodiment may be adopted. Further, instead of the felt member or the mesh member, as in the case of the third embodiment, the projections 48 forming the fuel gas channel 46 and the projections 168 forming the oxygen-containing gas channel 86 may be adopted.

Figure 17:
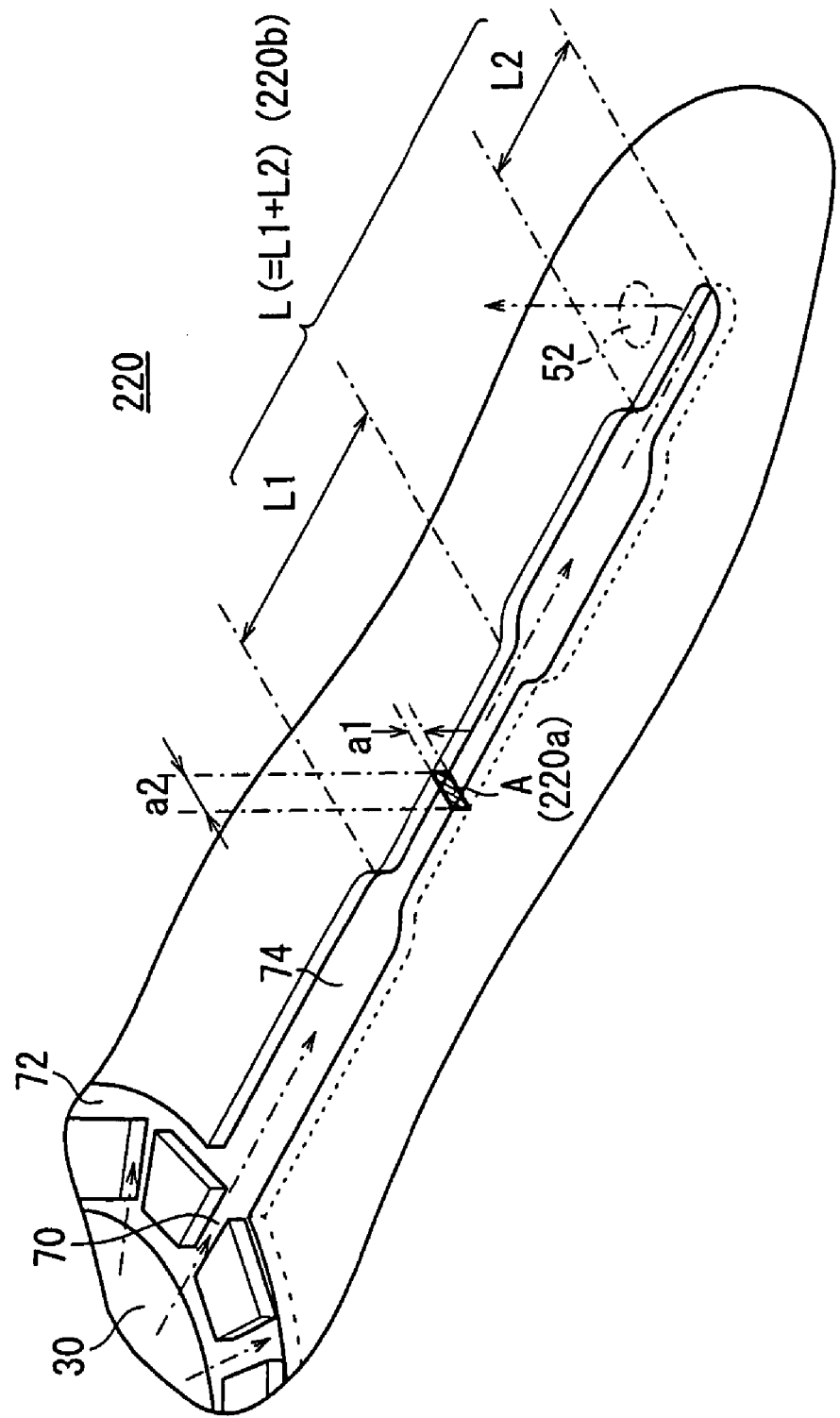
FIG. 17 is a perspective view schematically showing a pressure loss generator mechanism of a fuel cell according to a fifth embodiment of the present invention.
Figure 18:
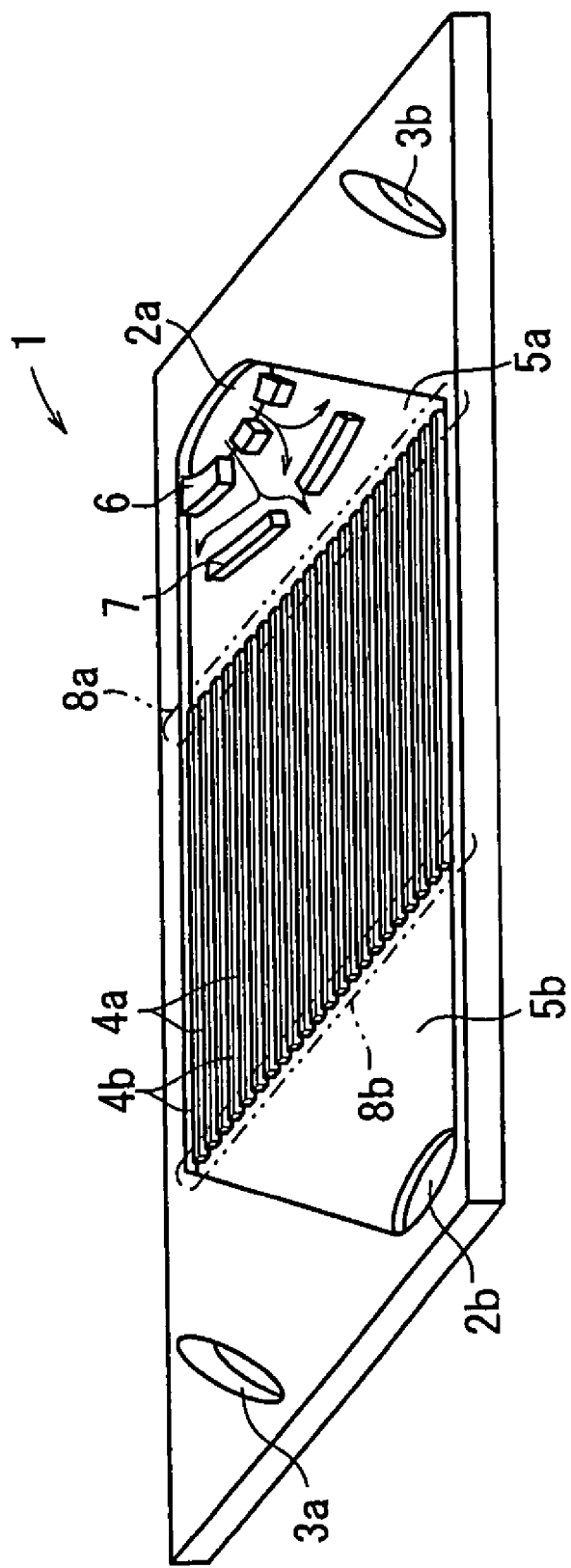
FIG. 18 is a cross sectional view showing a separator of a conventional flat SOFC.

FIG. 17 is a perspective view schematically showing a pressure loss generator mechanism 220 of a fuel cell according to a fifth embodiment of the present invention.

The pressure loss generator mechanism 220 generates a pressure loss partially in the fuel gas supply channel 74 for equally distributing the fuel gas to the electrolyte electrode assemblies 26. The pressure loss generator mechanism 220 includes first pressure loss generator sections 220a and a second pressure loss generator section 220b. Each of the first pressure loss generator sections 220a generates the pressure loss by reducing the opening cross sectional area A of the fuel gas supply channel 74 in comparison with the opening cross sectional area of the fuel gas supply passage 30. The second pressure loss generator section 220b generates the pressure loss by fabricating the fuel gas supply channel 74 to satisfy the relationship: $D/L \leq 0.1$ where L is the total length of a length L1 and a length L2 in areas of the first pressure loss generator sections 220a, and D is a characteristic length in the opening cross sectional area A of the fuel gas supply channel 74.

In the fifth embodiment, preferably, a large separator in comparison with the separators of the first to fourth embodiments is adopted for making it possible to generate the pressure loss partially in the fuel gas supply channel 74, and achieve the sufficient length of the fuel gas supply channel 74.

In the case where the length L1 and the length L2 are the same in each of the fuel gas supply channels 74, it is possible to ensure that the same degree of the pressure loss is generated in each of the fuel gas supply channels 74. Further, the design for equally distributing the fuel gas to the electrolyte electrode assemblies 26 can be made easily, and it becomes unnecessary that the fuel gas supply channels 74 have the same length. Further, the pressure loss is generated partially in the fuel gas supply channel 74, and the pressure loss is not essentially generated in the entire fuel gas supply channel 74. Thus, it is possible to correctly estimate the degree of the pressure loss generated in the fuel gas supply channel 74.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking electrolyte electrode assemblies between separators, said electrolyte electrode assemblies each including an anode, a cathode, and an electrolyte interposed between said anode and said cathode, a plate of each separator comprising:

a plurality of sandwiching sections for sandwiching said electrolyte electrode assemblies, at least a fuel gas inlet opening into a fuel gas channel for supplying a fuel gas along an electrode surface of said anode or an oxygen-containing gas inlet opening into an oxygen-containing gas channel for supplying an oxygen-containing gas along an electrode surface of said cathode being formed in each of said sandwiching sections, wherein the fuel gas channel or the oxygen-containing gas channel is formed on a first surface of each of the sandwiching sections of the plate, the first surface facing the electrode surface of the anode or the electrode surface of the cathode;

a plurality of bridges connected to said sandwiching sections, and each having a continuous reactant gas supply channel for supplying the fuel gas to said fuel gas inlet or supplying the oxygen-containing gas to said oxygen-containing gas inlet, wherein the continuous reactant gas supply channel extends along a second surface, opposite from the first surface, of each of the sandwiching sections of the plate, wherein the second surface of each of the sandwiching sections of the plate is free of projections;

a reactant gas supply unit integrally connected to said bridges, a reactant gas supply passage for supplying the fuel gas or the oxygen-containing gas to said reactant gas supply channel extending through said reactant gas supply unit in a stacking direction; and a pressure loss generator mechanism provided in said reactant gas supply channel, said pressure loss generator mechanism generating a pressure loss over the entire reactant gas supply channel for distributing the fuel gas or the oxygen-containing gas equally to each of said electrolyte electrode assemblies, wherein said pressure loss generator mechanism comprises:

a first pressure loss generator section that generates pressure loss by reducing a cross sectional area of said reactant gas supply channel in comparison with an opening cross sectional area of said reactant gas supply passage, and a second pressure loss generator section that generates the pressure loss by satisfying a relationship of $D/L \leq 0.1$ where L is the length of said reactant gas supply channel, and D is a characteristic length in the cross sectional area.

2. A fuel cell according to claim 1, wherein said sandwiching sections are provided at equal angular intervals around said reactant gas supply unit.

3. A fuel cell according to claim 2, wherein said sandwiching sections are arranged along a virtual circle around said reactant gas supply unit.

4. A fuel cell according to claim 2, wherein said bridges are provided at equal angular intervals around said reactant gas supply unit, corresponding to said sandwiching sections.

5. A fuel cell formed by stacking electrolyte electrode assemblies between separators, said electrolyte electrode assemblies each including an anode, a cathode, and an electrolyte interposed between said anode and said cathode, a plate of each separator comprising:

a plurality of sandwiching sections for sandwiching said electrolyte electrode assemblies, at least a fuel gas inlet opening into a fuel gas channel for supplying a fuel gas along an electrode surface of said anode or an oxygen-containing gas inlet opening into an oxygen-containing gas channel for supplying an oxygen-containing gas along an electrode surface of said cathode being formed in each of said sandwiching sections, wherein the fuel gas channel or the oxygen-containing gas channel is formed on a first surface of each of the sandwiching sections of the plate, the first surface facing the electrode surface of the anode or the electrode surface of the cathode;

a plurality of bridges connected to said sandwiching sections, and each having a continuous reactant gas supply channel for supplying the fuel gas to said fuel gas inlet or supplying the oxygen-containing gas to said oxygen-containing gas inlet, wherein the continuous reactant gas supply channel extends along a second surface, opposite from the first surface, of each of the sandwiching sections of the plate, wherein the second surface of each of the sandwiching sections of the plate is free of projections;

a reactant gas supply unit integrally connected to said bridges, a reactant gas supply passage for supplying the fuel gas or the oxygen-containing gas to said reactant gas supply channel extending through said reactant gas supply unit in a stacking direction; and a pressure loss generator mechanism provided in said reactant gas supply channel, said pressure loss generator mechanism generating a pressure loss partially in said reactant gas supply channel for distributing the fuel gas or the oxygen-containing gas equally to each of said electrolyte electrode assemblies, wherein said pressure loss generator mechanism comprises:
 a first pressure loss generator section generating the pressure loss by reducing a cross sectional area of said reactant gas supply channel in comparison with an opening cross sectional area of said reactant gas supply passage, and
 a second pressure loss generator section generating the pressure loss by satisfying a relationship of $D/L \leq 0.1$ where L is the length of part with the pressure loss in said reactant gas supply channel, and D is a characteristic length in the cross sectional area.

6. A fuel cell according to claim 5, wherein said sandwiching sections are provided at equal angular intervals around said reactant gas supply unit.

7. A fuel cell according to claim 6, wherein said sandwiching sections are arranged along a virtual circle around said reactant gas supply unit.

8. A fuel cell according to claim 6, wherein said bridges are provided at equal angular intervals around said reactant gas supply unit, corresponding to said sandwiching sections.

9. A fuel cell stack formed by stacking a plurality of fuel cells formed by stacking electrolyte electrode assemblies and separators, said electrolyte electrode assemblies each including an anode, a cathode, and an electrolyte interposed between said anode and said cathode, a plate of each separator comprising:

a plurality of sandwiching sections for sandwiching said electrolyte electrode assemblies, at least a fuel gas inlet opening into a fuel gas channel for supplying a fuel gas along an electrode surface of said anode or an oxygen-containing gas inlet opening into an oxygen-containing gas channel for supplying an oxygen-containing gas along an electrode surface of said cathode being formed in each of said sandwiching sections, wherein the fuel gas channel or the oxygen-containing gas channel is formed on a first surface of each of the sandwiching sections of the plate, the first surface facing the electrode surface of the anode or the electrode surface of the cathode;

a plurality of bridges connected to said sandwiching sections, and each having a continuous reactant gas supply channel for supplying the fuel gas to said fuel gas inlet or supplying the oxygen-containing gas to said oxygen-containing gas inlet, wherein the continuous reactant gas supply channel extends along a second surface, opposite from the first surface, of each of the sandwiching sections of the plate, wherein the second surface of each of the sandwiching sections of the plate is free of projections;

a reactant gas supply unit integrally connected to said bridges, a reactant gas supply passage for supplying the fuel gas or the oxygen-containing gas to said reactant gas supply channel extending through said reactant gas supply unit in a stacking direction; and a pressure loss generator mechanism provided in said reactant gas supply channel, said pressure loss generator mechanism generating a pressure loss over the entire reactant gas supply channel for distributing the fuel gas or the oxygen-containing gas equally to each of said electrolyte electrode assemblies in a direction along a surface of said separator and in the stack direction, wherein said pressure loss generator mechanism comprises:
 a first pressure loss generator section generating the pressure loss by reducing a cross sectional area of said reactant gas supply channel in comparison with an opening cross sectional area of said reactant gas supply passage, and
 a second pressure loss generator section generating the pressure loss by satisfying a relationship of $D/L \leq 0.1$ where L is the length of said reactant gas supply channel, and D is a characteristic length in the cross sectional area.

10. A fuel cell stack formed by stacking a plurality of fuel cells formed by stacking electrolyte electrode assemblies and separators, said electrolyte electrode assemblies each including an anode, a cathode, and an electrolyte interposed between said anode and said cathode, a plate of each separator comprising:

a plurality of sandwiching sections for sandwiching said electrolyte electrode assemblies, at least a fuel gas inlet opening into a fuel gas channel for supplying a fuel gas along an electrode surface of said anode or an oxygen-containing gas inlet opening into an oxygen-containing gas channel for supplying an oxygen-containing gas along an electrode surface of said cathode being formed in each of said sandwiching sections, wherein the fuel gas channel or the oxygen-containing gas channel is formed on a first surface of each of the sandwiching sections of the plate, the first surface facing the electrode surface of the anode or the electrode surface of the cathode;

a plurality of bridges connected to said sandwiching sections, and each having a continuous reactant gas supply channel for supplying the fuel gas to said fuel gas inlet or supplying the oxygen-containing gas to said oxygen-containing gas inlet, wherein the continuous reactant gas supply channel extends along a second surface, opposite from the first surface, of each of the sandwiching sections of the plate, wherein the second surface of each of the sandwiching sections of the plate is free of projections;

a reactant gas supply unit integrally connected to said bridges, a reactant gas supply passage for supplying the fuel gas or the oxygen-containing gas to said reactant gas supply channel extending through said reactant gas supply unit in a stacking direction; and a pressure loss generator mechanism provided in said reactant gas supply channel, said pressure loss generator mechanism generating a pressure loss partially in said reactant gas supply channel for distributing the fuel gas or the oxygen-containing gas equally to each of said electrolyte electrode assemblies in a direction along a surface of said separator and in the stacking direction, wherein said pressure loss generator mechanism comprises:
- a first pressure loss generator section generating the pressure loss by reducing a cross sectional area of said reactant gas supply channel in comparison with an opening cross sectional area of said reactant gas supply passage, and
- a second pressure loss generator section generating the pressure loss by satisfying a relationship of $D/L \leq 0.1$ where L is the length of part with the pressure loss in said reactant gas supply channel, and D is a characteristic length in the cross sectional area.

11. A fuel cell according to claim 1, wherein:
the reactant gas supply channel and the fuel gas channel are connected through the fuel gas inlet; or
the reactant gas supply channel and the oxygen-containing gas channel are connected through the oxygen-containing gas inlet.

12. A fuel cell according to claim 5, wherein:
the reactant gas supply channel and the fuel gas channel are connected through the fuel gas inlet; or
the reactant gas supply channel and the oxygen-containing gas channel are connected through the oxygen-containing gas inlet.

13. A fuel cell stack according to claim 9, wherein:
the reactant gas supply channel and the fuel gas channel are connected through the fuel gas inlet; or
the reactant gas supply channel and the oxygen-containing gas channel are connected through the oxygen-containing gas inlet.

14. A fuel cell stack according to claim 10, wherein:
the reactant gas supply channel and the fuel gas channel are connected through the fuel gas inlet; or
the reactant gas supply channel and the oxygen-containing gas channel are connected through the oxygen-containing gas inlet.

* * * * *